United States Patent [19]

Shapiro et al.

[11] Patent Number: 5,777,720
[45] Date of Patent: Jul. 7, 1998

[54] METHOD OF CALIBRATING AN OBSERVER TRACKING DISPLAY AND OBSERVER TRACKING DISPLAY

[75] Inventors: Larry Saul Shapiro, Middlesex; Basil Arthur Omar, Oxfordshire; Richard Robert Moseley, Oxford; Graham John Woodgate, Oxfordshire, all of United Kingdom

[73] Assignee: Sharp Kabushiki Kaisha, Osaka, Japan

[21] Appl. No.: 733,623

[22] Filed: Oct. 17, 1996

[30] Foreign Application Priority Data

Oct. 18, 1995 [GB] United Kingdom ................ 9521390

[51] Int. Cl.$^6$ .............................. A61B 3/02; A61B 3/00
[52] U.S. Cl. ........................................... 351/237; 351/246
[58] Field of Search ........................ 351/237, 246, 351/247, 209, 210, 206, 205, 211, 222, 200

[56] References Cited

FOREIGN PATENT DOCUMENTS

| | | |
|---|---|---|
| 656555 | 6/1995 | European Pat. Off. |
| 0708351 | 4/1996 | European Pat. Off. |
| 721131 | 7/1996 | European Pat. Off. |
| 726482 | 8/1996 | European Pat. Off. |
| 9406249 | 3/1994 | WIPO |
| 9420875 | 9/1994 | WIPO |
| 9618925 | 6/1996 | WIPO |

Primary Examiner—Hung X. Dang

[57] ABSTRACT

A calibration method is provided for an observer tracking display, for instance of the autostereoscopic 3D type, which forms steerable viewing zones and which comprises a tracking system for tracking an observer and a controller for controlling the viewing zones in response to the tracking system. The viewing zones are steered to direct light in a plurality of directions in turn. The observer then moves to the optimum position for viewing the display. The tracking system determines the optimum position for each viewing zone direction and the positions and directions are stored in association with each other so as to form a mapping in the controller for controlling the viewing zones in response to the tracking system during normal use of the display.

37 Claims, 22 Drawing Sheets

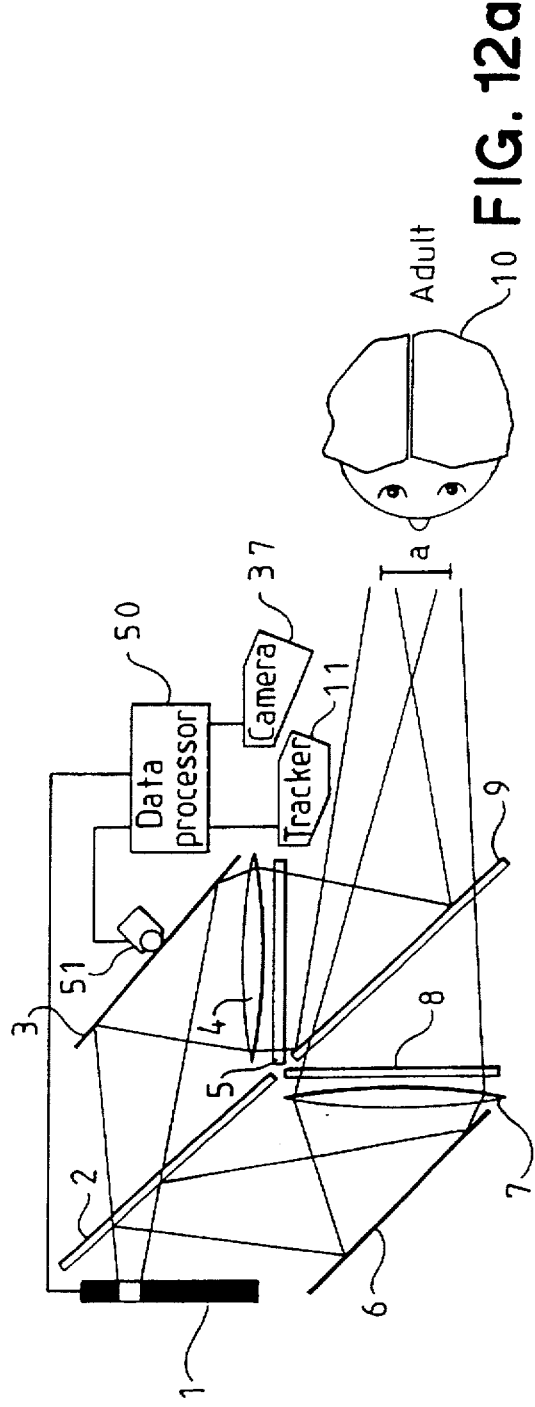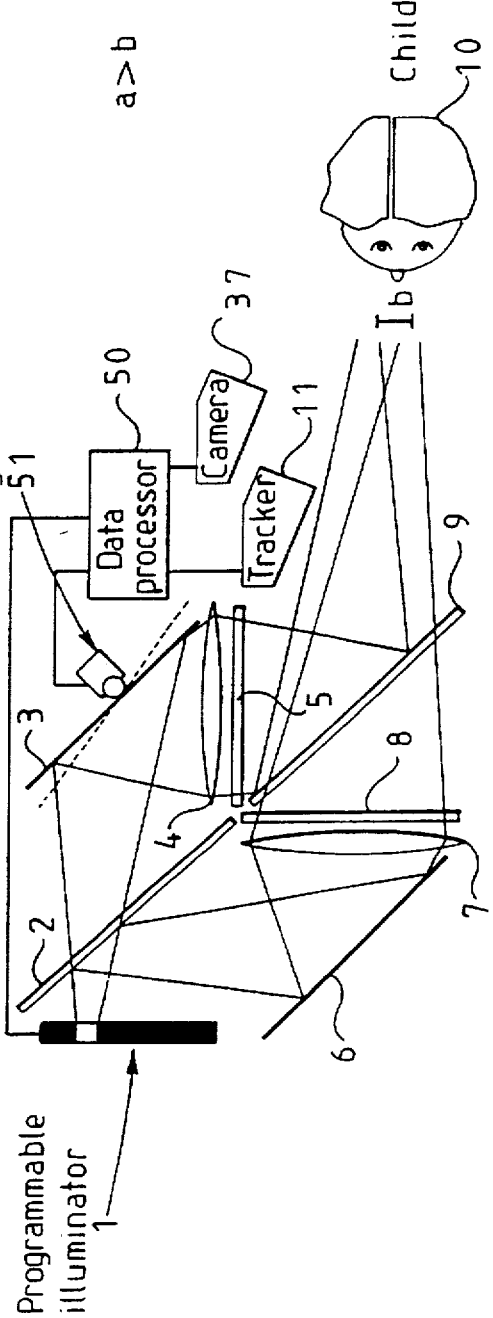

METHOD OF CALIBRATING AN OBSERVER TRACKING DISPLAY AND OBSERVER TRACKING DISPLAY

BACKGROUND OF THE INVENTION

1. Field of the Invention the present invention relates to a method of calibrating an observer tracking display. Such a method may be used for calibrating a 2- or 3-dimensional display, such as an autostereoscopic 3-dimensional (3D) display. The present invention also relates to a display, for example, an observer tracking autostereoscopic 3D display.

2. Description of the Related Art

EP 0 656 555 discloses an autostereoscopic 3D display of the observer tracking type. Autostereoscopic displays provide a three-dimensional viewing effect without requiring any viewing aids. The use of observer tracking allows a suitably encoded image to be viewed with a stereoscopic effect without requiring the display of a large number of different images. In such a display, a tracking system determines the position of an observer and controls a light source so that viewing zones are produced at the eyes of the observer within a substantial range of permitted observer movements. Tracking systems suitable for such use include electromagnetic systems, for instance responsive to infra-red light reflected from a reflector worn by the observer, magnetic systems responsive to a magnetic element worn by the observer, and so-called "vision systems" incorporating a camera or other suitable device and performing image processing to determine the presence and position of an observer's face or eyes.

Some observer tracking displays incorporate a steerable light source which has one or more controllable parameters for steering the light source and thus producing viewing zones at a desired position or in a desired direction. In order for a display to track the position and movement of an observer, the position data obtained by the tracking system have to be matched to the steering control parameter or parameters of the steerable light source. Effectively, this requires that a mapping be constructed from the region within which an observer may observe the display to the control parameter or parameters of the steerable light source.

A known method of constructing the mapping is based on forming a detailed mathematical model of the elements of the display and their interrelationships. Thus, a mathematical model is required of the optics of the display, which optics may comprise lenses, lenticular sheets, parallax barriers, beam combiners, beam splitters, and mirrors. Further, a mathematical model of the light emitters within the light source is required. A model of the tracking sensor of the tracking system is required, for instance in terms of its absolute accuracy, resolution, and sensor noise. Finally, the relative positioning and orientation of the elements is required, such as lens conjugate positions and physical location of the tracking sensor.

The resulting mapping determined by mathematical modelling inevitably incorporates inaccuracies. For instance, the complexity and incompleteness of mathematic models result in intrinsic inaccuracies.

Unavoidable abberations and manufacturing tolerances in the individual components lead to practical inaccuracies. Further, changes occur in certain variables once the system is in use, requiring re-calibration of "assembly line" settings. For instance, magnetic tracking systems tend to perform sub-optimally in magnetic environments which differ from the calibration environment.

Certain parameters are fixed on the basis of assumed typical or average observer parameters. For instance, the "eye-separation" or interocular distance of an observer is generally assumed to be 65 mm, which is the average interocular distance for an adult. Also, the viewing height of the viewing zones is generally located at a comfortable typical or average height for an adult. Thus, observers such as children who do not conform to these assumptions may have difficulty in viewing displays and in perceiving the three-dimensional effect of 3D displays. Although WO94/06249 discloses a 3D display which permits manual intervention to centre the viewing zones on the eyes of the observer, such an arrangement is inconvenient and difficult to use, particularly for an untrained observer.

The autostereoscopic 3D display shown in FIG. 1 is of the type disclosed in EP 0 656 555 and comprises a programmable illuminator 1 having a plurality of contiguous independently controllable light sources arranged as a one-dimensional array. Light from the illuminator 1 is divided by a beam splitter 2, for instance comprising a partially silvered mirror. Light passing through the beam splitter 2 is reflected by a mirror 3 via a converging lens 4, such as a fresnel lens, and through a spatial light modulator (SLM) 5. The SLM 5 comprises a liquid crystal device which spatially modulates light with a two dimensional image comprising a right eye view.

Light reflected by the beam splitter 2 is reflected by a mirror 6 through a lens 7, such as a fresnel lens, and through an SLM 8. The SLM 8 comprises a liquid crystal device for modulating light with an image forming a left eye view.

Light from the SLM 5 is reflected by a beam combiner 9, such as a partially silvered mirror, to a right eye viewing region whereas light from the SLM 8 passes through the beam combiner 9 to a left eye viewing region. An observer 10 whose left and right eyes are located at the left and right eye viewing zones, respectively, perceives a 3D image.

In order to permit freedom of movement of the observer 10 while maintaining the three-dimensional effect, a sensor 11 responds to the position of the observer 10. For instance, the sensor 11 may comprise an infra-red sensor which emits infra-red radiation and provides signals indicative of the position of an infra-red-reflective dot worn by the observer 10 on the forehead between the eyes. The sensor 11 forms part of a tracking system 12 which converts the output signals from the sensor 11 into data representing the position of the observer 10. The output of the tracking system 12 is supplied to a controller 13 whose output controls an illuminator driver 14 which drives the individual light sources of the programmable illuminator 1.

The display further comprises a video controller 46 connected via a switch 45 to the output of the tracking system 12. The outputs of the video controller 46 supply the image data to the SLMs 5 and 8. When the switch 45 is open, the video controller 46 supplies fixed left and right eye image data to the SLMs 5 and 8 so that the observer 10 sees the same autostereoscopic image irrespective of position. When the switch 45 is closed, a "look around" facility is provided in which the image data supplied by the video controller 46 to the SLMs 5 and 8 vary according to the position of the observer 10 as determined by the tracking system 12.

The controller 13 contains a mapping store 15 in the form of a read only memory which contains a mapping in the form of a look-up table. The mapping converts position data from the tracking system 12 into signals suitable for controlling the illuminator driver 14 so as to illuminate the light source or sources required to produce viewing zones at the eyes of the observer 10. The mapping contained in the store 15 is formed on the basis of a mathematical model of the optical elements of the display and the interrelationships between these elements and the illuminator 1. As described hereinbefore, such an arrangement has disadvantages in that errors, tolerances, and the like can render the mapping in the store 15 ineffective in ensuring that the observer 10 perceives an autostereoscopic 3D image throughout the observer region in which the display is capable of producing viewing regions.

SUMMARY OF THE INVENTION

According to a first aspect of the invention, there is provided a method of calibrating an observer tracking display of the type forming a steerable viewing zone and comprising a tracking system for tracking the position of an observer and a controller for controlling the direction of the viewing zone in response to the tracking system the method comprising the steps of: steering the viewing zone in a plurality of directions in turn; establishing an optimum viewing position for each of the directions; determining each of the optimum positions by means of the tracking system; and associating in the controller each of the determined optimum positions with the corresponding direction.

Preferably, the establishing step comprises establishing each optimum viewing position at a position of greatest light intensity.

Preferably, the establishing step comprises establishing each optimum viewing position at the centre of the viewing zone.

Preferably, the display is an autostereoscopic 3D display forming first and second viewing zones.

Preferably, the establishing step comprises establishing each optimum viewing position at a position substantially equidistant from the centres of the first and second viewing zones.

Preferably, the establishing step establishes each optimum position at a position of minimum crosstalk between the first and second viewing zones.

Preferably, the establishing step comprises moving a light sensor until each optimum viewing position is established.

Preferably, the sensor is the observer.

Preferably, the associating step comprises forming a mapping from the determined optimum positions to a steering control parameter of the viewing zone or zones.

Preferably, the map forming step further comprises interpolating between the determined optimum positions.

Preferably, the interpolation is a linear interpolation.

According to a second aspect of the invention, there is provided a method of calibrating an observer tracking display of the type forming a steerable viewing zone and comprising a tracking system for tracking the position of an observer and a controller for controlling the directions of the viewing zone in response to the tracking system the method comprising the steps of: locating at a plurality of positions in turn a sensor for determining optimum illumination; positioning the viewing zone in an optimum direction at which the sensor is optimally illuminated; determining the position of the sensor by means of the tracking system; and associating in the controller each of the optimum directions with the corresponding determined position.

Preferably, the positioning step comprises positioning the viewing zone so that the sensor determines greatest light intensity.

Preferably, the positioning step comprises positioning the viewing zone so that the sensor is nearest the centre of the viewing zone.

Preferably, the display is an autostereoscopic 3D display forming first and second viewing zones.

Preferably, the sensor comprises first and second sensing regions and the positioning step comprises positioning the viewing zones for optimum illumination of the first and second sensing regions by the first and second viewing zones, respectively.

Preferably, the sensor is a reflector.

Preferably, an imaging device monitors the reflector for detecting optimal illumination.

Preferably, the associating step comprises forming a mapping from the determined positions to a steering parameter of the viewing zone or zones.

Preferably, the map forming step further comprises interpolating between the determined positions.

Preferably, the interpolation is a linear interpolation.

According to a third aspect of the invention, there is provided an observer tracking autostereoscopic 3D display comprising means for forming steerable first and second viewing zones, characterised by a vision system and a controller, the vision system being arranged to determine the positions of eyes of an observer and to determine the positions of the first and second viewing zones with respect to the eyes, the controller being arranged to control the forming means so as to position the first and second viewing zones optimally with respect to the eyes.

Preferably, the forming means is controllable so as to match the horizontal spacing of the first and second viewing zones to the interocular distance of the observer.

Preferably, the controller is arranged to perform a calibration by forming a mapping from observer positions to a control parameter of the forming means.

Preferably, the controller is arranged to update the mapping periodically.

Preferably, the controller is arranged to store a plurality of viewing zone parameters corresponding to a plurality of observers and to use the or each corresponding parameter when the vision system recognises any of the plurality of observers.

According to a fourth aspect of the invention, there is provided a method of calibrating an observer tracking display of the type which forms a plurality of fixed viewing zones and which comprises a tracking system for tracking the position of an observer and a controller for controlling images supplied to the viewing zones in response to the tracking system, the method comprising the steps of: displaying different images in at least two of the viewing zones; establishing at least one viewing position for the at least two viewing zones; determining the or each viewing position by means of the tracking system; and deriving from the or each determined position an image changing point for the controller.

Preferably, the displaying step comprises displaying the different images in the viewing zones of a plurality of pairs of viewing zones in turn.

Preferably, the or each established viewing position comprises an optimum viewing position for the at least two viewing zones.

Preferably, the or each optimum viewing position comprises a position substantially equidistant from and symmetrical with respect to the centres of two of the viewing zones.

Preferably, the or each optimum viewing position comprises a position of minimum crosstalk between two of the viewing zones.

Preferably, the or each established viewing position comprises an edge of the viewing zones.

Preferably, the establishing step comprises moving a light sensor until the or each viewing position is established.

Preferably, the light sensor is the observer.

Preferably, the deriving step comprises forming a mapping from the or each determined position to the or each image changing point.

Preferably, there is a plurality of determined positions and the map forming step comprises interpolating between the determined positions.

It is thus possible to provide techniques which permit observer tracking displays to be calibrated without requiring mathematical modelling and requiring little or no detailed information about the display elements and their interrelationships. Although such techniques are advantageous for observer tracking displays of all types, such techniques are particularly advantageous for autostereoscopic 3D displays in which pairs of viewing zones are required to track accurately the respective eyes of the or each observer. The inaccuracies and limitations of known mathematical modelling techniques described hereinbefore are completely eliminated. Calibration may be performed simply and quickly and may be performed in the intended display location so as to avoid inaccuracies which may result from any change from the calibration environment, for instance of magnetic tracking systems. Such techniques are immune to manufacturing tolerances and assembly and alignment tolerances.

It is further possible to provide a display which automatically compensates for viewers who differ from norms or averages. For instance, such display adapt automatically to different interocular distances, for instance of children as compared with adults. Further, such displays permit or improve viewing at heights which are different from average adult height. Also, such displays can compensate for viewer preferences which differ from norms, such as longer viewing distance.

It is thus possible to provide displays having improved performance and/or reduced cost of manufacture. Such displays may, for instance, be used as autostereoscopic 3D displays in 3D television, 3D computer aided design and graphics, 3D medical imaging, virtual reality, and computer games.

BRIEF DESCRIPTION OF THE DRAWINGS

The present invention will be further described, by way of example, with reference to the accompanying drawings, in which:

FIGS. 12a and 12b are diagrams showing an autostereoscopic 3D display constituting a third embodiment of the invention;

Like reference numerals refer to like parts throughout the drawings.

DESCRIPTION OF THE EMBODIMENTS

Figure 1:
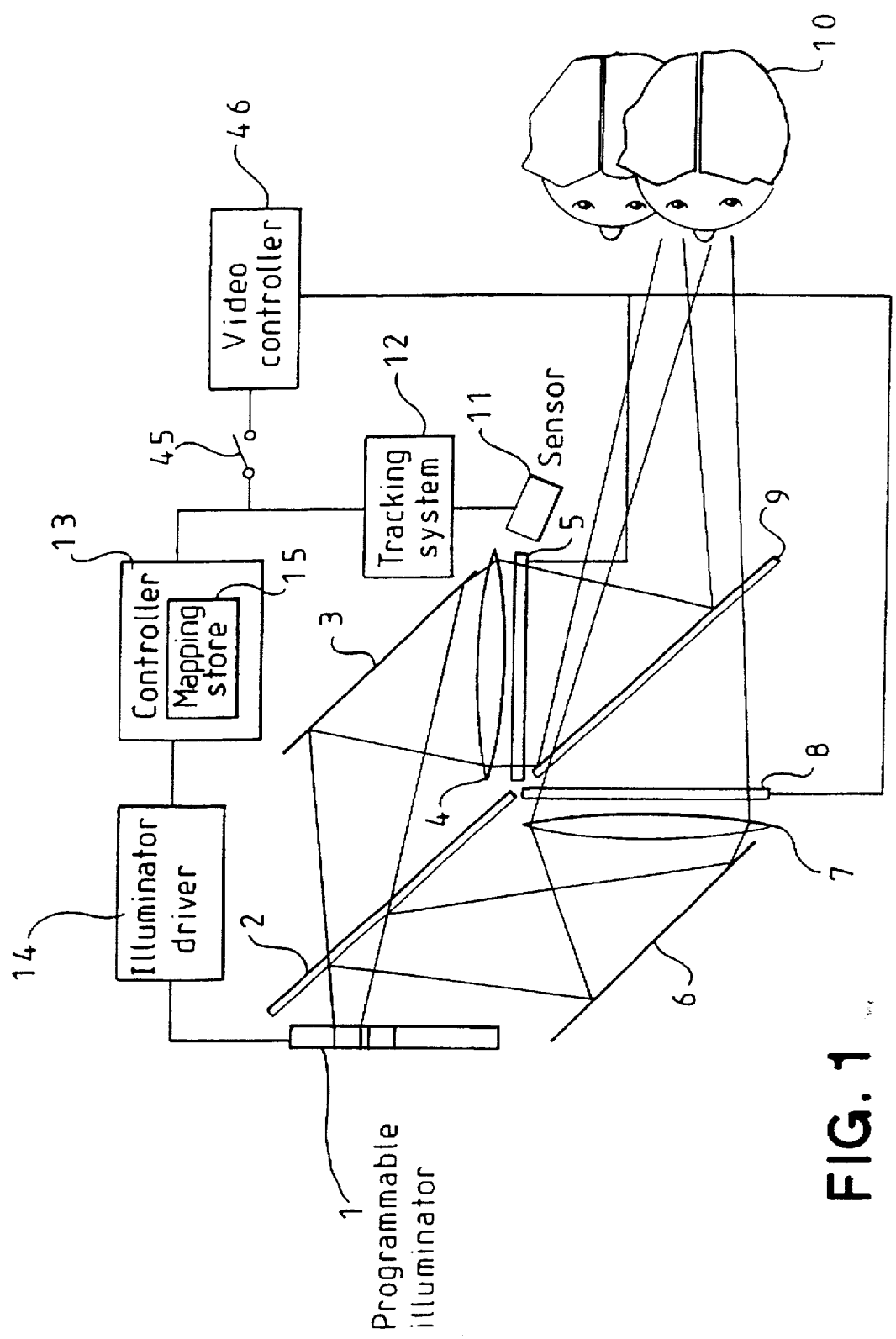
FIG. 1 is a diagram of a known type of autostereoscopic 3D display.
Figure 2:
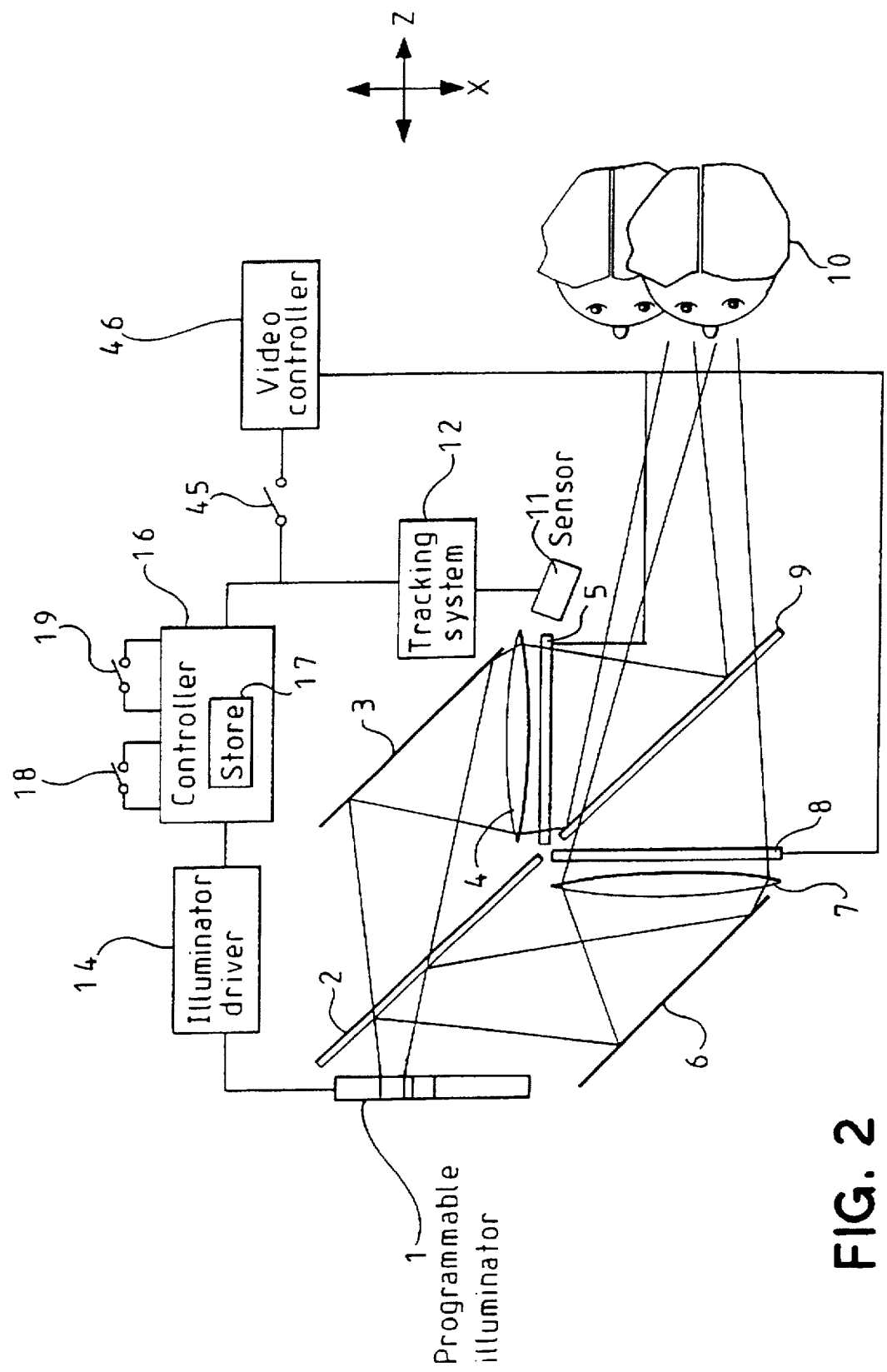
FIG. 2 is a diagram of an autostereoscopic 3D display for performing a method constituting a first embodiment of the invention.

FIG. 2 illustrates an observer tracking autostereoscopic 3D display similar to that shown in FIG. 1 but in which the controller 13 is replaced by a modified type of controller 16 containing a non-volatile read/write store 17. The controller 16 further comprises a switch 18 for selecting between calibration and normal operation and a switch 19 which is manually operable during calibration for storing calibration mapping points in the store 17.

Figure 3:
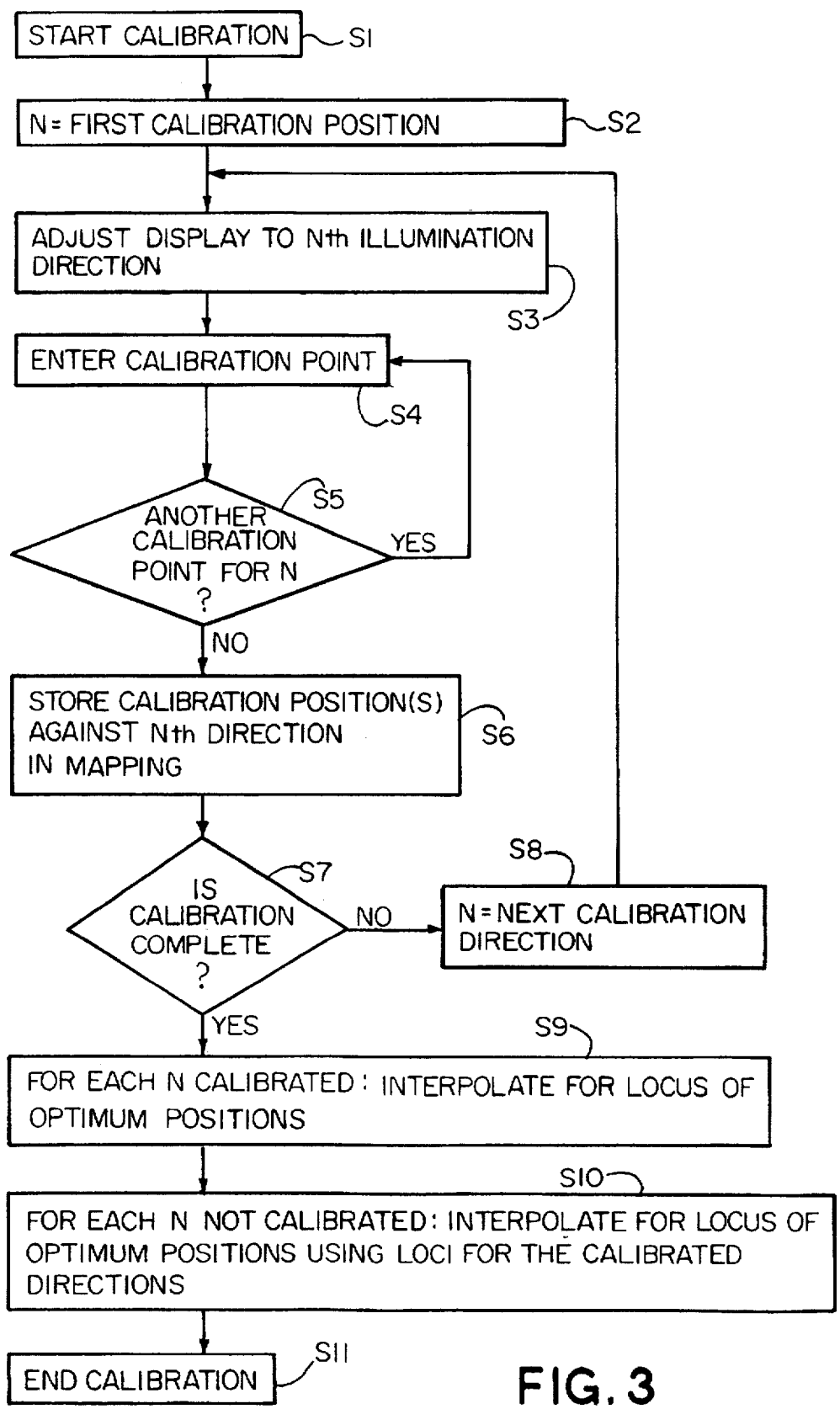
FIG. 3 is a flow diagram illustrating a calibration method constituting the first embodiment of the invention.
Figure 6:
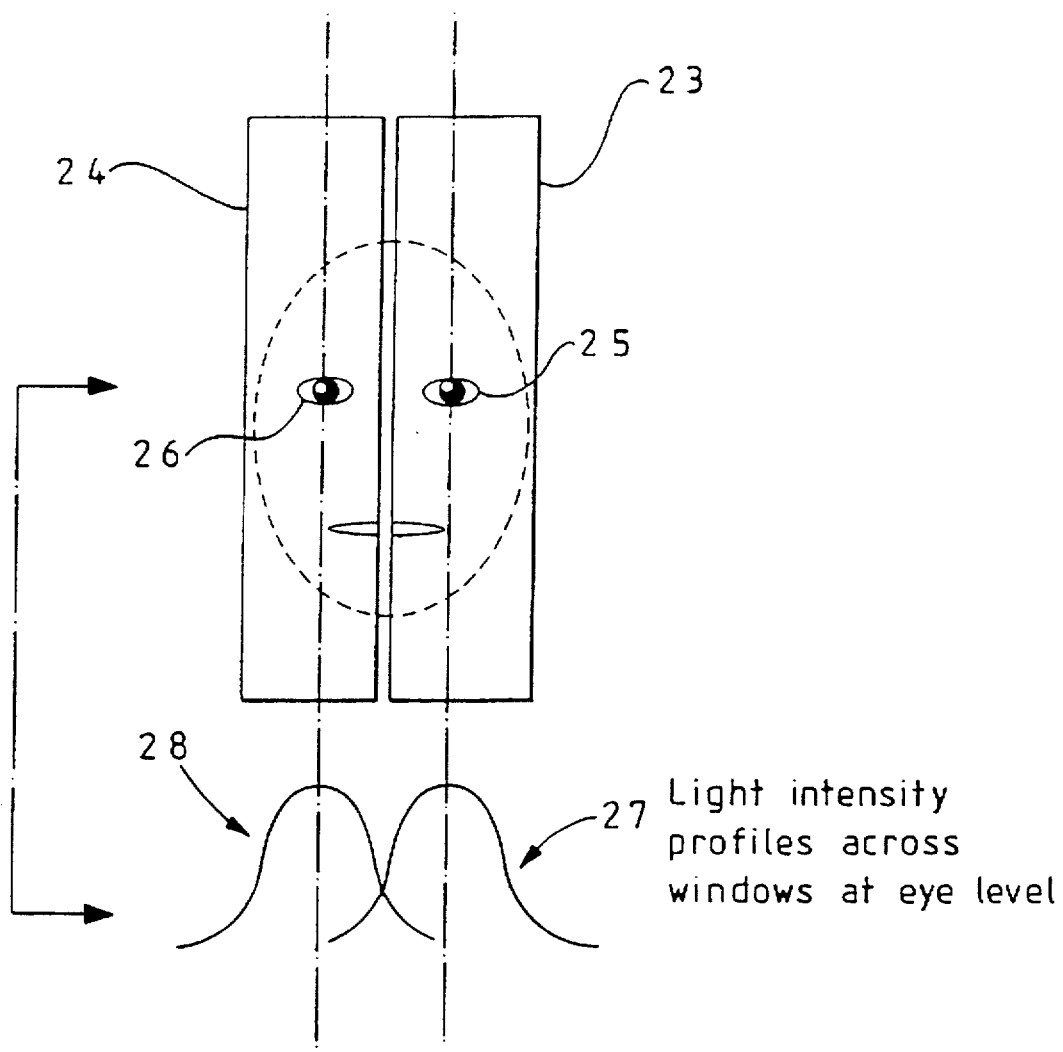
FIG. 6 illustrates diagrammatical viewing zones produced by the display of FIG. 2.

The display shown in FIG. 2 is supplied without a mapping in the store 17 but instead is calibrated in accordance with the method illustrated in FIG. 3. The switch 18 is actuated so as to start the calibration method at S1. At S2, a parameter N is set a first calibration position. At step S3, the display is adjusted to direct light in the Nth illumination direction. The SLMs 5 and 8 are controlled so as to be wholly transparent so that left and right eye images of the illuminated lamp are formed in the viewing region to define the left and right eye viewing zones. These viewing zones are illustrated at 23 and 24 in FIG. 6.

The observer moves his head laterally so as to locate the optimum position of the eyes 25 and 26 in relation to the viewing zones 23 and 24, respectively. In many cases, the light intensity profiles across the viewing zones or windows at eye level are as illustrated diagrammatically by the intensity curves 27 and 28 in FIG. 6. The optimum observer position thus corresponds to maximum equal light intensity perceived by the eyes 25 and 26 and this will normally correspond to symmetrical positioning of the eyes about a point mid-way between the centres of the viewing zones 23 and 24.

Alternatively, the SLMs 5 and 8 may be controlled so as to display images corresponding to a stereo pair. The observer then moves his head laterally so as to locate the optimum position of the eyes 25 and 26 in relation to the viewing zones 23 and 24 by judging the position which gives the best 3D image quality. Issues such as minimising the levels of crosstalk and maximising the uniformity of illumination allow the observer to determine the optimum position.

Once the observer has positioned his head at the optimum position, he actuates the switch 19 to perform the step S4. Step S5 determines whether another calibration point is required for the Nth illumination direction and, if so, repeats step S4. Otherwise, at step S6, the controller 16 enters in the store 17 the observer position as determined by the tracking system 12 against the control parameter for the Nth illumination direction of the illuminator 1. A calibration point of the mapping is thus stored in the store 17.

A step S7 determines whether the calibration is complete, for instance whether all of the illumination directions have been calibrated. If not, the variable N is incremented at S8 and the calibration is procedure repeated for the new illumination direction.

If so, step S9 performs an interpolation for each calibrated illumination direction between the calibration points entered by the steps S4 and S5 to form a locus of optimum positions. Step S10 then interpolates between these loci to form further loci if necessary, each of which corresponds to an uncalibrated illumination direction. Calibration ends at S11.

Figure 4:
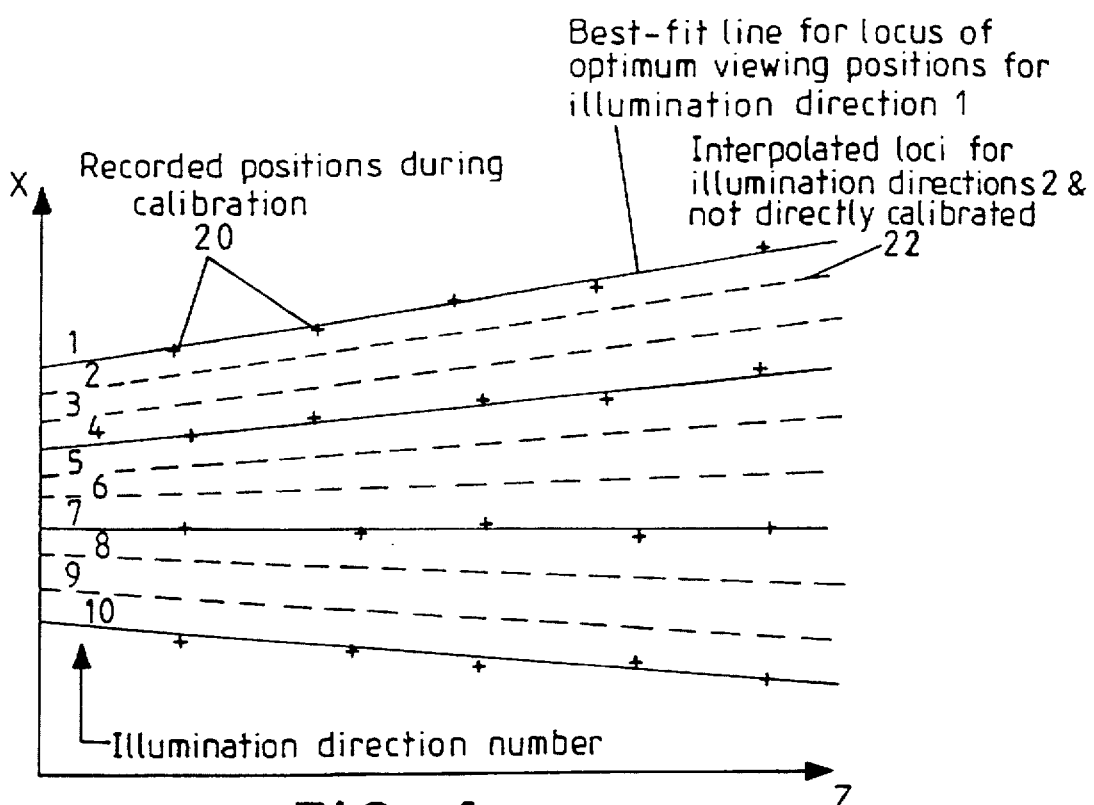
FIG. 4 is a graph of lateral observer position against longitudinal observer position illustrating recording of optimum positions and interpolation therebetween.

Calibration and interpolation are illustrated in FIG. 4. By performing interpolation, it is not necessary to calibrate every illumination direction so as to reduce the calibration time required. Difficult displays have 30 to 50 illumination directions, each of which requires several calibration points so that several hundred calibration points will be required to perform a full calibration of the display. By selecting, for instance, evenly spaced calibration directions with a sufficient number of calibration points per direction and then performing the interpolations of the steps S9 and S10, calibration time is reduced to practical levels without any substantial loss of calibration accuracy.

For systems having 2 or more degrees of freedom, comprehensive calibration would be impractical. For instance, for a system having 40 lateral positions and 10 longitudinal positions, 400 possible illumination positions would have to be calibrated. However, by calibrating 8 lateral positions and 5 longitudinal positions, the number of calibrations can be reduced to 40 with interpolation being used between these positions.

FIG. 4 illustrates such interpolation techniques. Although ten illumination directions could be calibrated, only four evenly spaced directions (corresponding to illumination directions 1, 4, 7 and 10) are actually calibrated. For each direction, five optimum positions, such as those indicated at 20, are actually calibrated and the step S9 performs the interpolation to determine the locus shown at 21 and representing the best fit line for the recorded positions 20. The step S9 repeats this for each of the other three calibrated illumination directions to produce the unbroken lines shown in FIG. 4.

The step S10 then performs interpolations between the loci performed in step S9. An interpolation is performed for each illumination direction to produce the loci indicated by broken lines such as 22.

Figure 5:
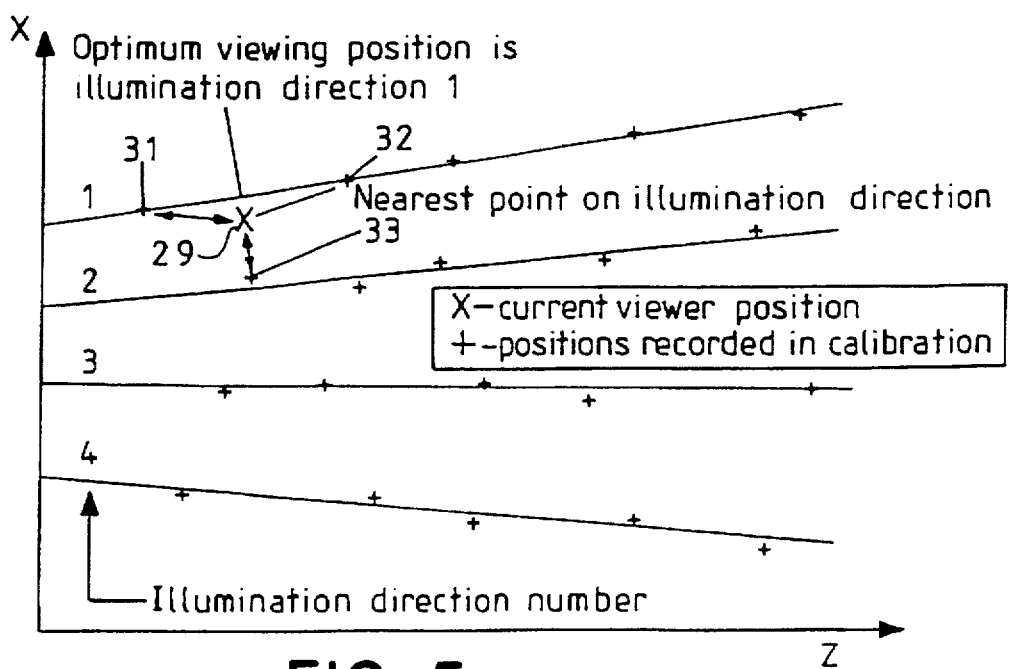
FIG. 5 is a graph similar to FIG. 4 but illustrating possible incorrect determination of optimum viewing direction.

Although the interpolations have been described as being performed during the calibration, it is also possible to omit the interpolations in the steps S9 and S10 from the calibration and to perform such an interpolation during actual observer tracking based on the recorded positions 20. Unless such for m of interpolation is performed, errors can occur as illustrated in FIG. 5. In this case, an observer is located at position 29 and the nearest calibrated optimum positions are shown at 31, 32, and 33. Although the optimum illumination direction for the observer would be that labelled 1, the nearest recorded position 33 corresponds to illumination direction 2 and, if no interpolation had been performed, the wrong illumination direction could be selected. However, the interpolation technique illustrated in FIG. 4 makes this less likely to happen, since the selected locus will be the one which is closest to the actual position of the observer.

The procedure is sufficient for an illuminator 1 having a single control parameter. For illuminators having more than one control parameter, the variable N is a vector of dimension equal to the number of parameters. The calibration procedure is then repeated while stepping through values of the vector N so as to provide calibration in respect of all of the control parameters.

When calibration of the display is complete, the observer actuates the switch 18 to return to normal operation. Writing into the store 17 is thus prevented unless and until further calibration is required. During normal operation of the display, the tracking system 12 tracks, by means of the sensor 11, the position of the observer 10 and supplies the position data to the controller 16. When the position is on one of the loci such as 21 and 22 shown in FIG. 4, the store 17 supplies at its output a signal corresponding to the lamp of the illuminator 1 which is required to be illuminated in order to place the viewing zones at the respective eyes of the observer 10. For position data representing positions intermediate the loci, the controller 16 selects the locus to which the position is nearest and illuminates the lamp for that illumination direction in order to position viewing zones at the eyes of the observer. The tracking system 12 and its sensor 11 track the position of the observer 10 and the controller 16 ensures that the viewing zones track the eyes of the observer.

It is thus possible to provide a simple and reliable technique for calibrating an observer tracking display which overcomes the problems associated with mathematical modelling techniques as used in known displays of the type shown in FIG. 1. The display may require only a single initial calibration, in which case the mapping calibration points stored in the store 17 are retained indefinitely. However effects such as ageing and change of environment of the display may cause the stored mapping to become inaccurate. For instance, if the sensor 11 is a magnetic sensor responding to a magnetic element worn by the observer 10, moving the display to a magnetically different environment may affect the accuracy of calibration. The display may then be re-calibrated as necessary by actuating the switch 18 and following the method described hereinbefore.

Figure 7:
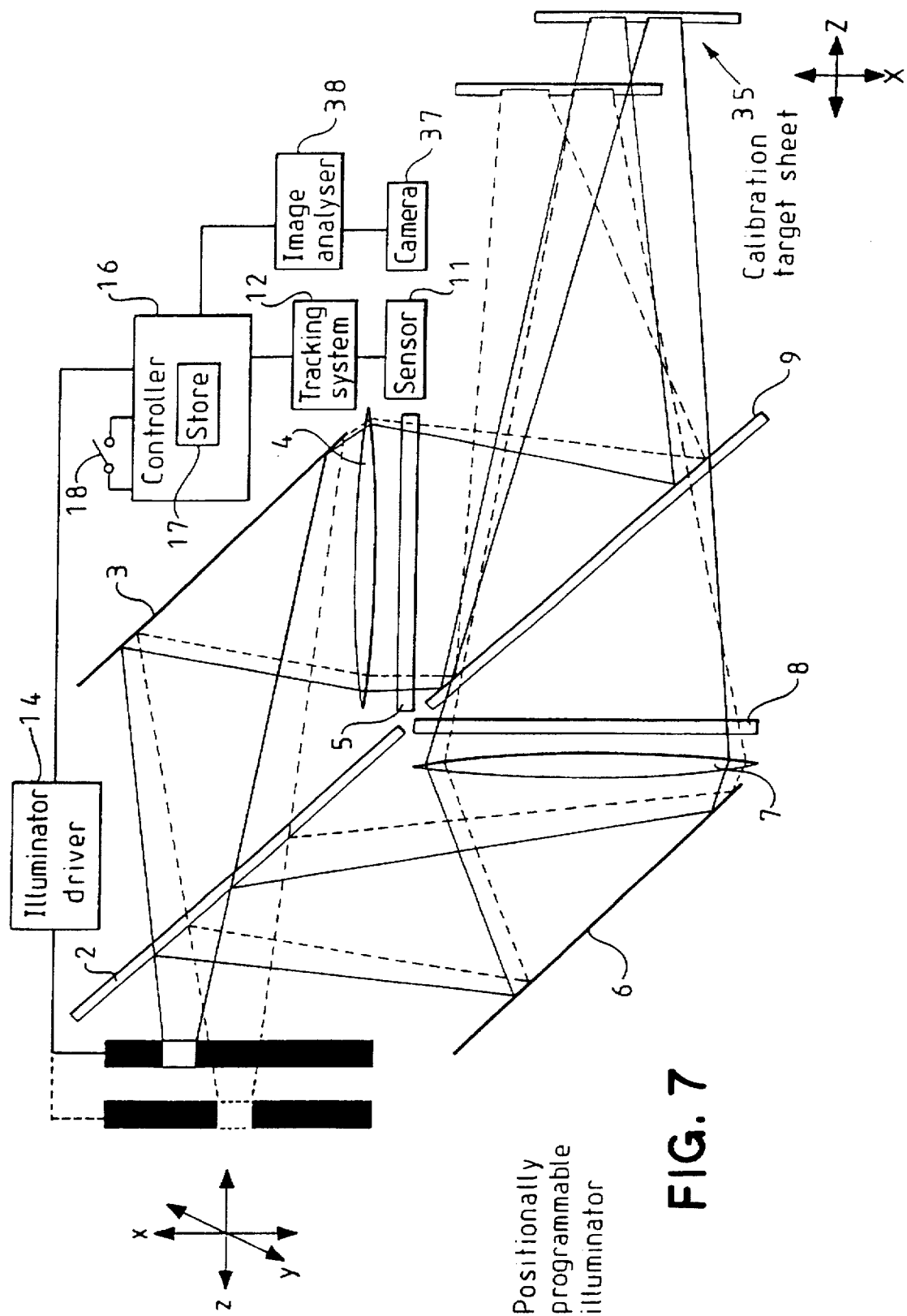
FIG. 7 is a diagram of an autostereoscopic 3D display for performing a method constituting a second embodiment of the invention.

The display shown in FIG. 7 differs in several respects from that shown in FIG. 2. During the calibration method, the observer 10 is replaced by a calibration target sheet 35 which is movable, either manually or automatically, within the trackable viewing region. During calibration, the target sheet carries an element, such as an infra-red-reflective dot or a magnetic element, for cooperating with the sensor 11 to determine the position of the target sheet.

The controller 16 does not require the manually operable switch 19 but is connected to an imaging system comprising a camera 37 connected to an image analyser 38. The camera 37 is arranged so as to be capable of viewing the target sheet 35 throughout the trackable viewing region, or may be movable so as to be capable of viewing the target sheet throughout the trackable region. The camera 37 may be arranged to view visible light, or alternatively may be an infra-red, or any other suitable type of camera.

Figures 8, 9:
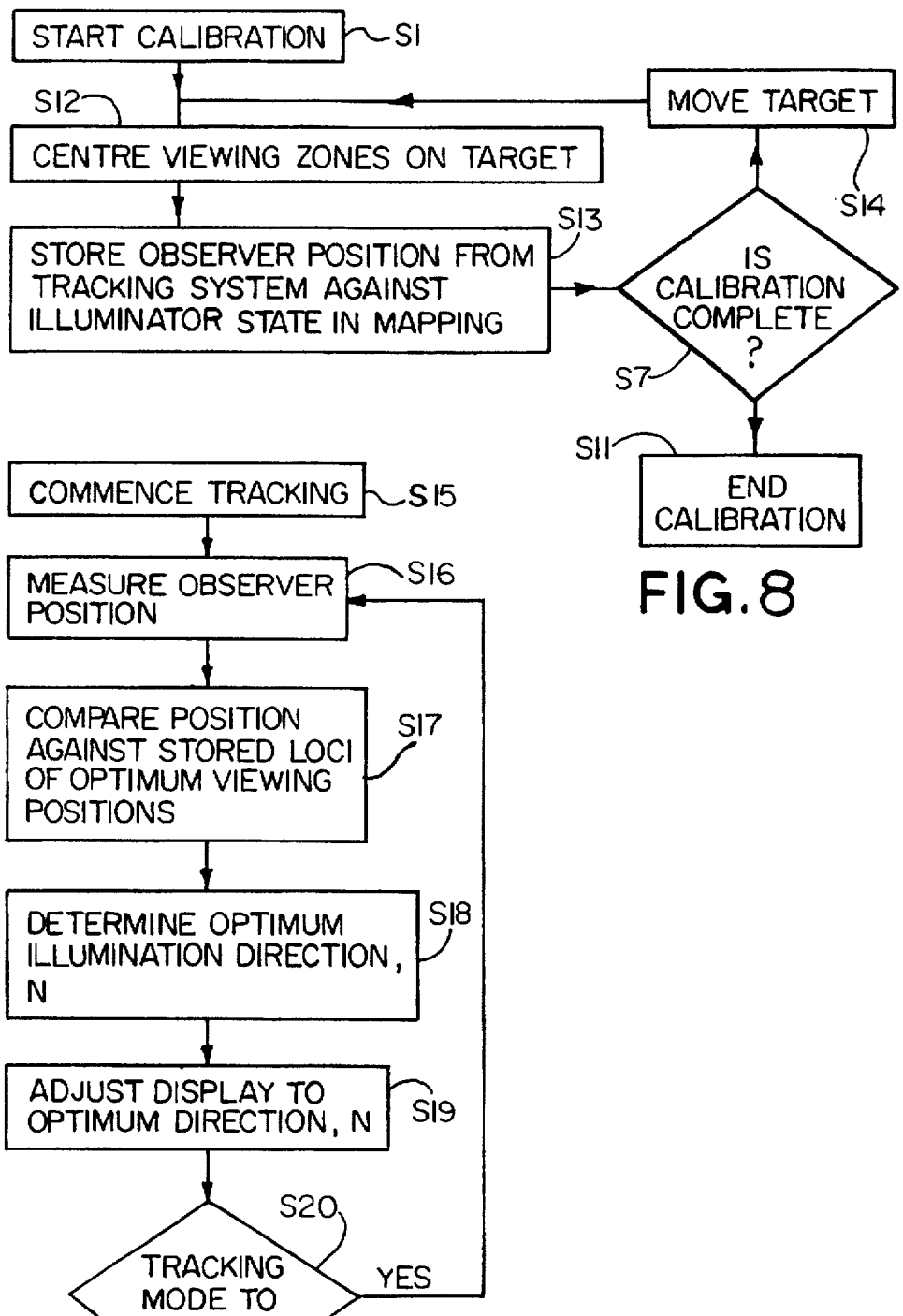
FIG. 8 is a flow diagram illustrating a calibration method constituting the second embodiment of the invention.
FIG. 9 is a flow diagram illustrating observer tracking by the displays of FIGS. 2 and 7.

The calibration method for displays shown in FIG. 7 is illustrated in FIG. 8. The calibration target sheet 35 is placed in the trackable viewing region, for instance manually by an operator or by a robot arrangement. The camera 37 monitors the state of illumination of the sheet 35 and the image analyser 38 analyses the image. The controller 16 steers the programmable illuminator 1, which is shown as being capable of movement in mutually orthogonal x, y and z directions. This may be achieved by means of actual movement of the illuminator or may be simulated by controlling individually actuable light sources or a liquid crystal shutter or parallax barrier disposed in front of a backlight. The image analyser 38 controls the effective position of the illuminator via the controller 16 until the viewing zones produced by the display are optimally placed on the sheet 35. This is indicated by step S12 in FIG. 8 and comprises positioning the viewing zones on the sheet 35 in the relationship with respect to the sensing element on the sheet 35 which the viewing zones are intended to have with respect to the sensing element when worn by an observer. When optimum viewing zone positioning has been achieved, the position of the target sheet 35 as determined by the tracking system 12 and the sensor 11 thereof is stored in the store 17 against the state of illumination of the illuminator 1 so as to enter a calibration point of the mapping. This is indicated at step S13 in FIG. 8. Step S7 then determines whether calibration is complete, for instance when a volume map shows that the trackable region has been suitably traversed, and, if not, the target sheet 35 is moved at step S14 and the calibration process repeated.

FIG. 9 illustrates operation of the displays shown in FIGS. 2 and 7 to perform observer tracking. Tracking is commenced at step S15 and the position of the observer is measured at step S16 by the sensor 11 and the tracking system 12. At step S17, the measured position is compared with loci of optimum viewing positions held in the store 17. These loci may, for instance, have been obtained by performing the steps S9 and S10 of FIG. 3 during calibration between the steps S7 and S11 of FIG. 8.

Step S18 determines the optimum illumination direction and step S19 adjusts the display to direct light in the optimum direction. In particular, the controller 16 supplies data to the illuminator driver 14 for switching on the lamps of the illuminator which direct light in the illumination direction.

At step S20, a check is performed as to whether tracking mode should continue. If so, control returns to the step S16. If not, for instance because of manual deactuation of tracking, observer tracking is ended at S21.

No calibration of the imaging system is required since its role is to determine the relationship between the viewing zones and the sensing patterns on the target sheet 35. Subjective assessment of the viewing zones is thus eliminated as compared with the calibration method described hereinbefore with reference to FIGS. 2 to 6. Further, the increased automation provided by the calibration method illustrated in FIGS. 7 and 8 substantially reduces the time required for calibration. Although speed and reliability are improved, the calibration method shown in FIGS. 7 and 8 requires more complicated processing and extra hardware costs.

The imaging system shown in FIG. 7 may be of any suitable type for locating the sensing element on the target sheet and for locating the viewing zones. For instance, the imaging system may use the technique of "template matching", in which an image of the sensing element is pre-stored and the sensed image is systematically searched for correlation. An alternative technique is that of object recognition, in which the shape of the target sheet is defined and the imaging system searches for this shape. For instance, the target sheet 35 may comprise a retro-reflector with a sensing element in the form of a grey circle or square. The viewing zones appear on the target sheet 35 as light bars or rectangles and these may be detected by simple edge detection and line fitting methods.

If the analysis of the calibration signals produced is likely to take a relatively long time, all of the necessary calibration signals can be stored, the analysis of the signals to produce the required map or look-up table being carried out separately, for example, when the apparatus is not being used to view an image.

In a modification to the apparatus and method described with reference to FIGS. 7 and 8, the imaging system may comprise a system which is capable of recognising and determining the position of an observer, for instance by recognising and determining the positions of the eyes. In this case, the tracking system 12 and the associated sensor 11 are not required. No tracking element need be worn by the observer and the calibration target sheet 35 is unnecessary. Instead, the imaging system determines the observer position and also determines the positions of the viewing zones with respect to the observer position. The viewing zones appear as light bars on the face of the observer and the imaging system causes the controller 16 to move (or simulate movement of) the illuminator 1 until the light bars are optimally placed with respect to the eyes of the observer. The observer position determined by the imaging system is then stored in the store 17 against the illumination parameters of the illuminator 1 so as to provide a calibration point of the mapping for controlling the illuminator.

Although such a system may be used to compile a mapping in the store 17 during a calibration phase of the display, such calibration may in fact be unnecessary. In particular, the display may be arranged to perform continuous real time control of the illuminator 1 so as to ensure that the viewing zones are always optimally placed with respect to the eyes of the observer. As another possibility, the display may be initially calibrated and the calibration may then be checked periodically during use so as to adjust for time-varying effects, for instance resulting from ageing of the display.

Figure 10:
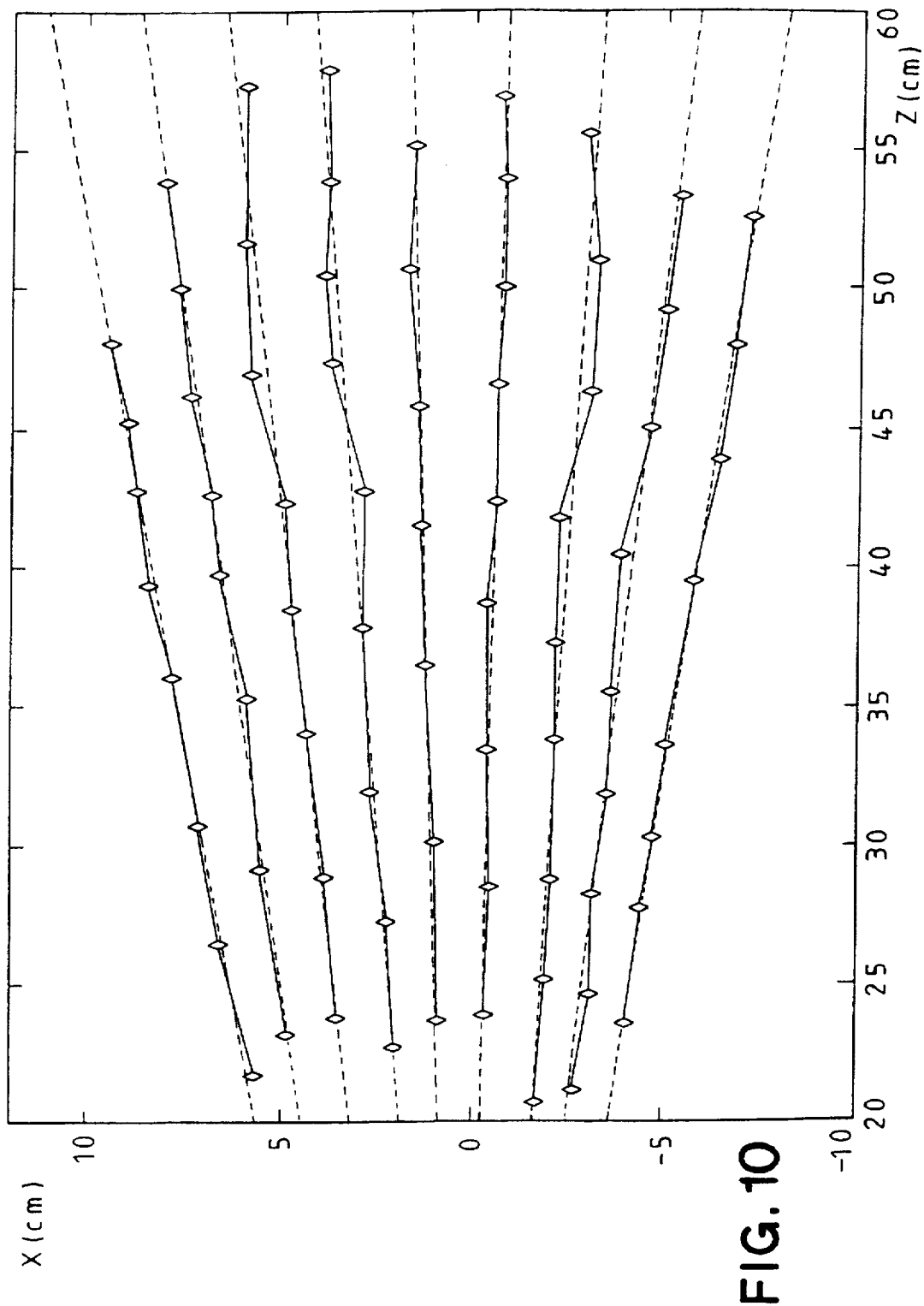
FIG. 10 is a graph illustrating calibration points obtained by the method illustrated in FIG. 8.

FIG. 10 illustrates graphically the locations of calibration points for the display FIG. 7. The vertical axis represents displacement in centimeters in the X direction i.e. laterally, whereas the horizontal axis represents position in the Z direction, representing variations in viewing distance of the display. The appropriate control parameters for the illuminator 1 are determined as described hereinafter.

Figure 11D:
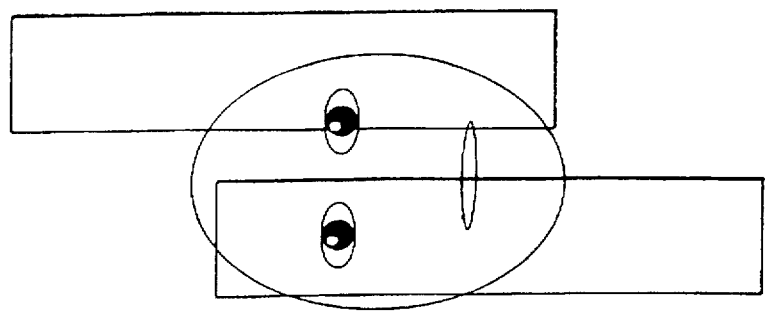
FIGS. 11a to 11d illustrate diagrammatically various viewing zone situations.
Figure 11C:
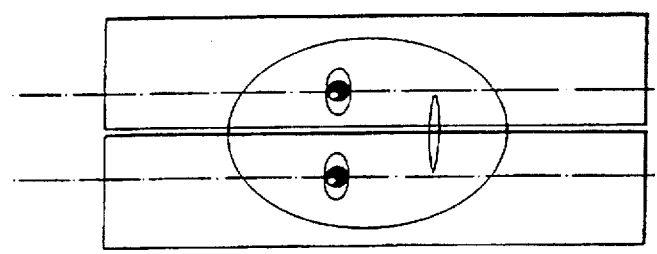
Figure 11B:
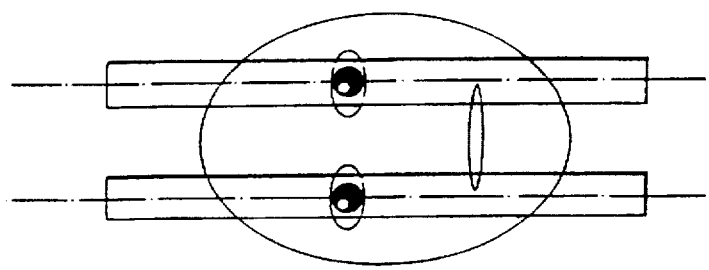
Figure 11A:
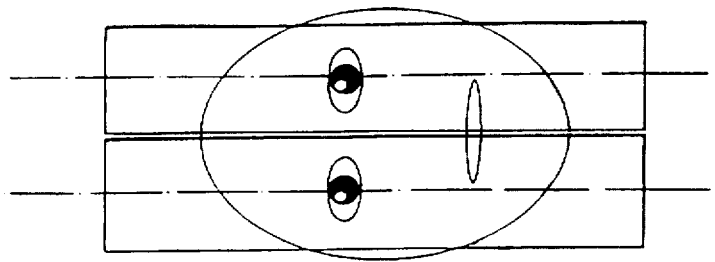

FIG. 11a illustrates the optimum positioning of viewing zones with respect to the eyes of an "average" adult observer whose interocular distance is 65 mm. The calibration methods described hereinbefore are intended to achieve this optimum positioning or a positioning of the viewing zones as close as possible to this optimum. In the case of illuminators which are capable of producing viewing zones of variable width, calibration may be performed with narrower than normal viewing zones, for instance as illustrated in FIG. 11b, this allows the accuracy of calibration to be improved over calibration performed with laterally more extended viewing zones.

FIG. 11c illustrates what may happen when an observer has an interocular distance less than the adult norm, for instance in the case of a child observer. Compensation for this may be provided automatically in systems of the type illustrated in FIG. 7 in which the imaging system detects the positions of the eyes and the tracking system is omitted. The viewing zones may then be optimally placed for the particular interocular distance of the observer. Similarly, for observers whose heights are substantially different from the adult norm, this type of display may vary the illuminator position in the y direction so as to ensure correct autostereoscopic viewing of the display.

The calibration techniques described hereinbefore may be used with any type of observer tracking display, particularly autostereoscopic 3D displays, in which a steerable illuminator is provided. In certain types of such displays, and particularly in the beam combiner type of display illustrated in FIG. 7, misalignment of the optical elements may give rise to the condition illustrated in FIG. 11d in which the left and right eye viewing zones are vertically staggered. This can result from incorrect alignment of one of the mirrors 3 and 6 with respect to the other mirror.

FIG. 12a illustrates a modification of the display shown in FIG. 7 which allows misalignments of the type shown at FIG. 11d to be eliminated. Further, this modified arrangement is particularly suitable for matching the viewing zones to different interocular distances as illustrated in FIG. 11C.

In FIG. 12a, the controller 16, the tracking system 12, the illuminator driver 14, and the image analyser 38 are represented by the data processor 50. In addition, the mirror 3 is mounted on a tilting mechanism 51 which is controlled by the data processor 50 so as to vary the orientation of the mirror 3 about vertical and horizontal axes. The data processor 50 analyses the images from the camera 37 and, when vertical staggering of the viewing zones of the type shown in FIG. 11d is detected, causes the mechanism 51 to vary the tilt of the mirror about the horizontal axis so as to ensure that the viewing zones become vertically aligned.

FIG. 12a illustrates an adult observer 10 having an interocular distance a. FIG. 12b illustrates the effect of correction for a child observer 10 whose interocular distance b is less than a. The data processor detects the different interocular distance or the misalignment of the viewing zones laterally with respect to the actual observer eyes and moves the mirror 3 about the vertical axis from the position illustrated by the broken line to the position illustrated by the unbroken line. The width of the light source is also adjusted if necessary so as to prevent overlap of the viewing zones. The viewing zones are thus optimally positioned for the child observer.

The use of an imaging system permits various other facilities to be provided within the display. For instance, using face-based recognition techniques, previously stored "preferred parameters" may be recalled when an observer for whom calibration has been performed is recognised. The display may therefore be automatically adapted to suit such an observer without requiring recalibration or recalculation of the parameters. Further, the viewing distance of the display may be varied to suit the actual position of the observer, for instance by varying the effective size of the illuminator or, in the case of displays employing lenses such as the lenses 4 and 7, by using a motorised platform controlled by the controller so as to change the lens conjugates.

It is thus possible to provide calibration techniques which may be used for autostereoscopic 3D displays so as to ensure that the observer maintains the stereoscopic effect as far as the optical design permits. Accurate calibration may be performed efficiently and rapidly and observer anatomical differences may be automatically accommodated. Improved accuracy of calibration and enhanced comfort of 3D viewing can therefore be provided. Incomplete mathematical modelling and manufacturing tolerances are automatically compensated. Recalibration may be performed whenever appropriate, for instance following a change of environment or to accommodate ageing effects.

The calibration methods described hereinbefore have been described with reference to a beam combiner type of display using bulk optics and wit illumination systems which are steered so as to track an observer by switching or moving lamps in the rear of the display. However, these calibration methods may be applied to other types of observer tracking autostereoscopic 3D displays as illustrated in FIGS. 13 to 19.

Figure 13:
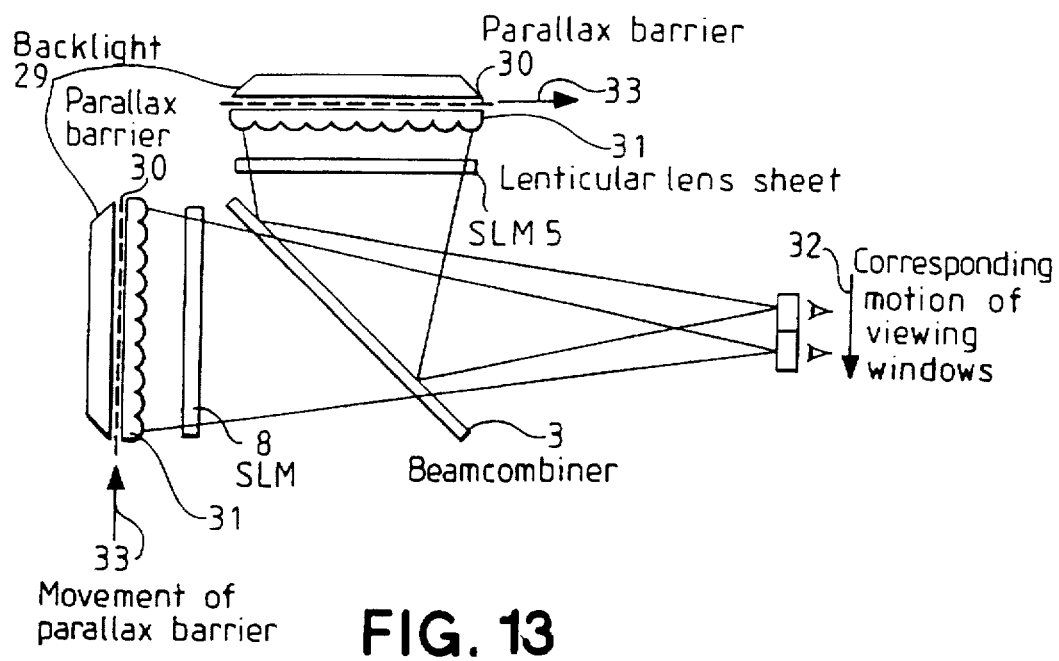
FIGS. 13 to 19 are diagrams of observer tracking autostereoscopic 3D displays which may be calibrated by the methods of FIGS. 3 and 8.

FIG. 13 illustrates a beam combiner display of the compact illuminator type. The display of FIG. 13 differs from the type of display shown in FIGS. 2 and 7 in that the illuminator 1, the beam splitter 2, the mirrors 3 and 6, and the lenses 4 and 7 are replaced by respective compact illuminators for the SLMs 5 and 6. This arrangement is of the type disclosed in EP 0 656 555 and the compact illuminators each comprise a backlight 29, a parallax barrier 30 and a lenticular screen or lens sheet 31. Each parallax barrier 30 cooperates with the corresponding backlight 29 to form a plurality of parallel elongate light sources corresponding to the barrier slits. The barriers are moveable laterally with respect to the lenticular screens 31 so as to provide steerable light sources for observer tracking. In order to move viewing windows in the direction of arrow 32, the parallax barriers 30 are moved in the directions of arrows 33 with respect to the lenticular screens 31 by an observer tracking system (not shown) of the type shown in FIG. 2 or 7.

Figure 14:
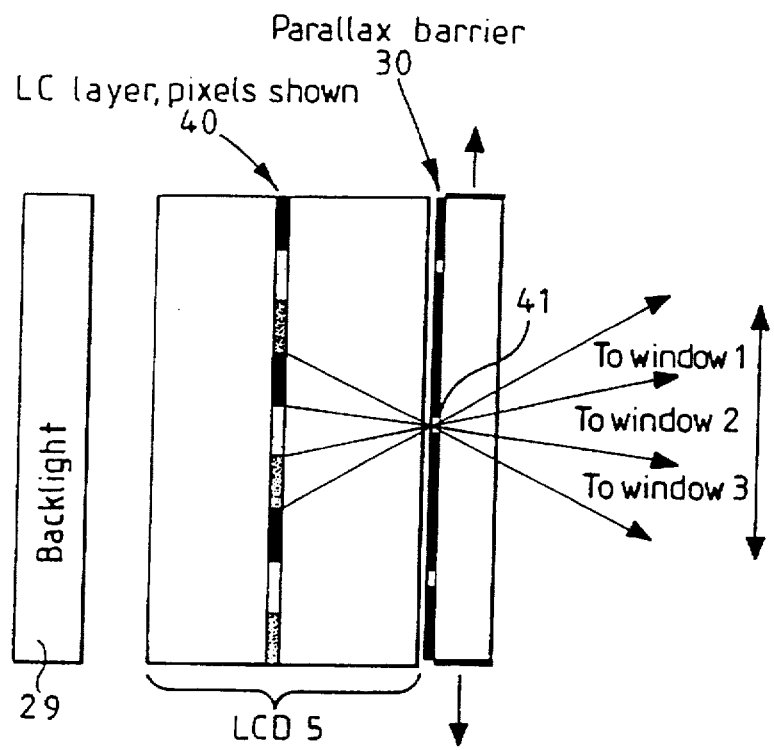

FIG. 14 illustrates another type of single SLM display for creating three viewing windows in viewing zones. The SLM comprises a liquid crystal device (LCD) 5 having a liquid crystal layer 40 for displaying picture elements (pixels) of three spatially multiplexed 2D views. The pixels are arranged as groups of three columns which may be horizontally contiguous and which cooperate with a respective slit such as 41 of a front parallax barrier 30 to define the viewing zones. The parallax barrier 30 is moveable with respect to the LCD 5 so as to permit observer tracking, for instance by tracking systems as described hereinbefore.

Figure 15:
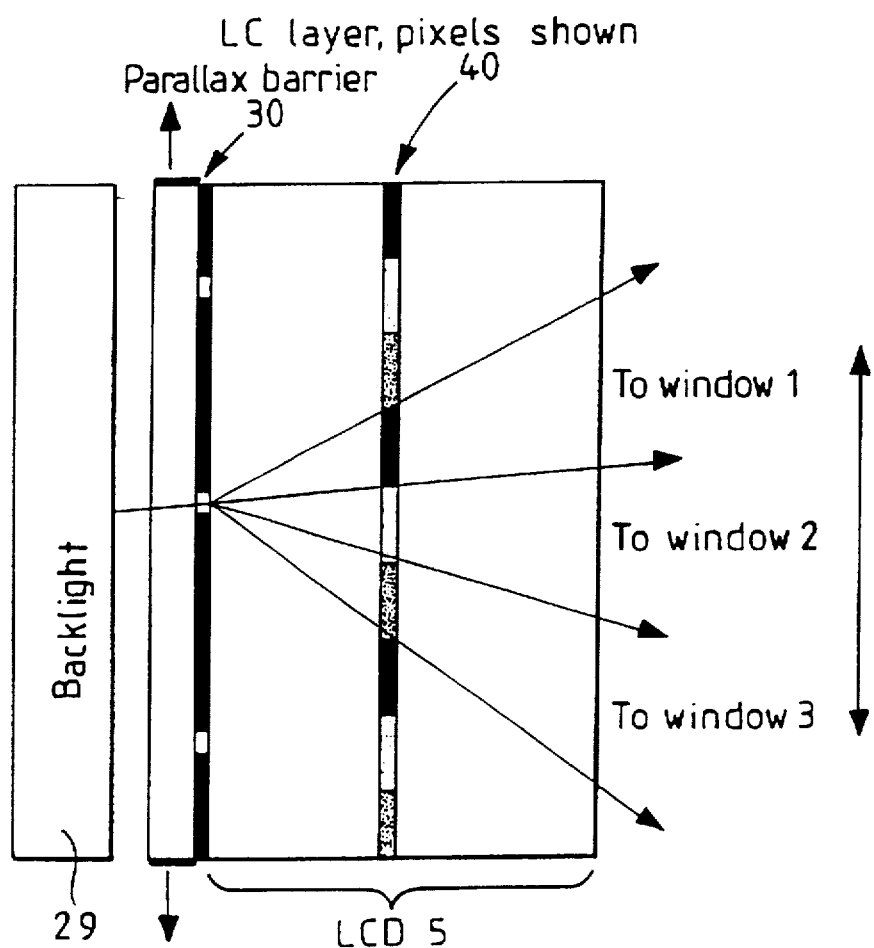

The display shown in FIG. 15 differs from that shown in FIG. 14 in that the parallax barrier 30 is disposed between the backlight 29 and the LCD 5. The backlight 29 and the barrier 30 act as parallel elongate light sources and the parallax barrier 30 is moveable with respect to the LCD 5 so as to steer the viewing zones and windows in order to track an observer in response to a tracking system as described hereinbefore.

Figure 16:
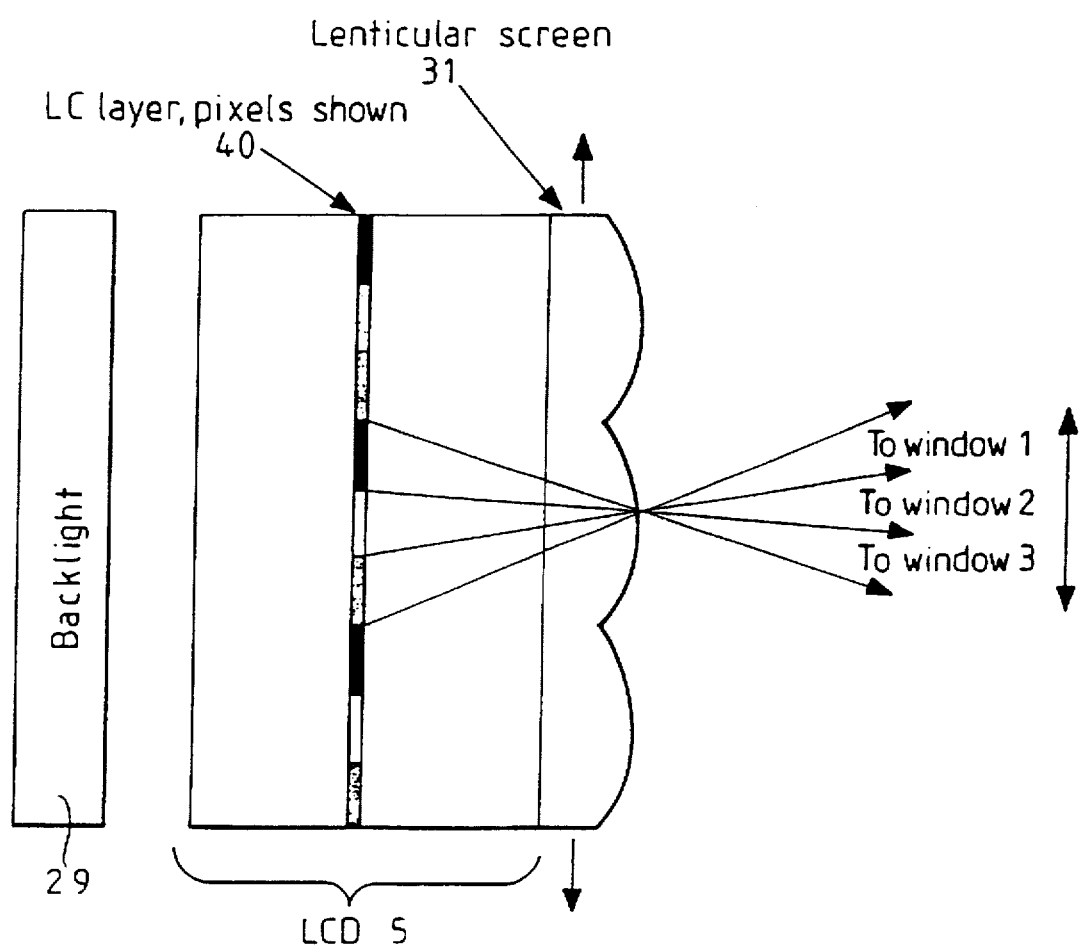

The display of FIG. 16 differs from that of FIG. 14 in that the front parallax barrier 30 is replaced by a lenticular screen 31 such that each lenticule of the screen cooperates with groups of three columns of pixels to form the three viewing zones and windows. The lenticular screen 31 is moveable with respect to the LCD 5 for observer tracking.

Figure 17:
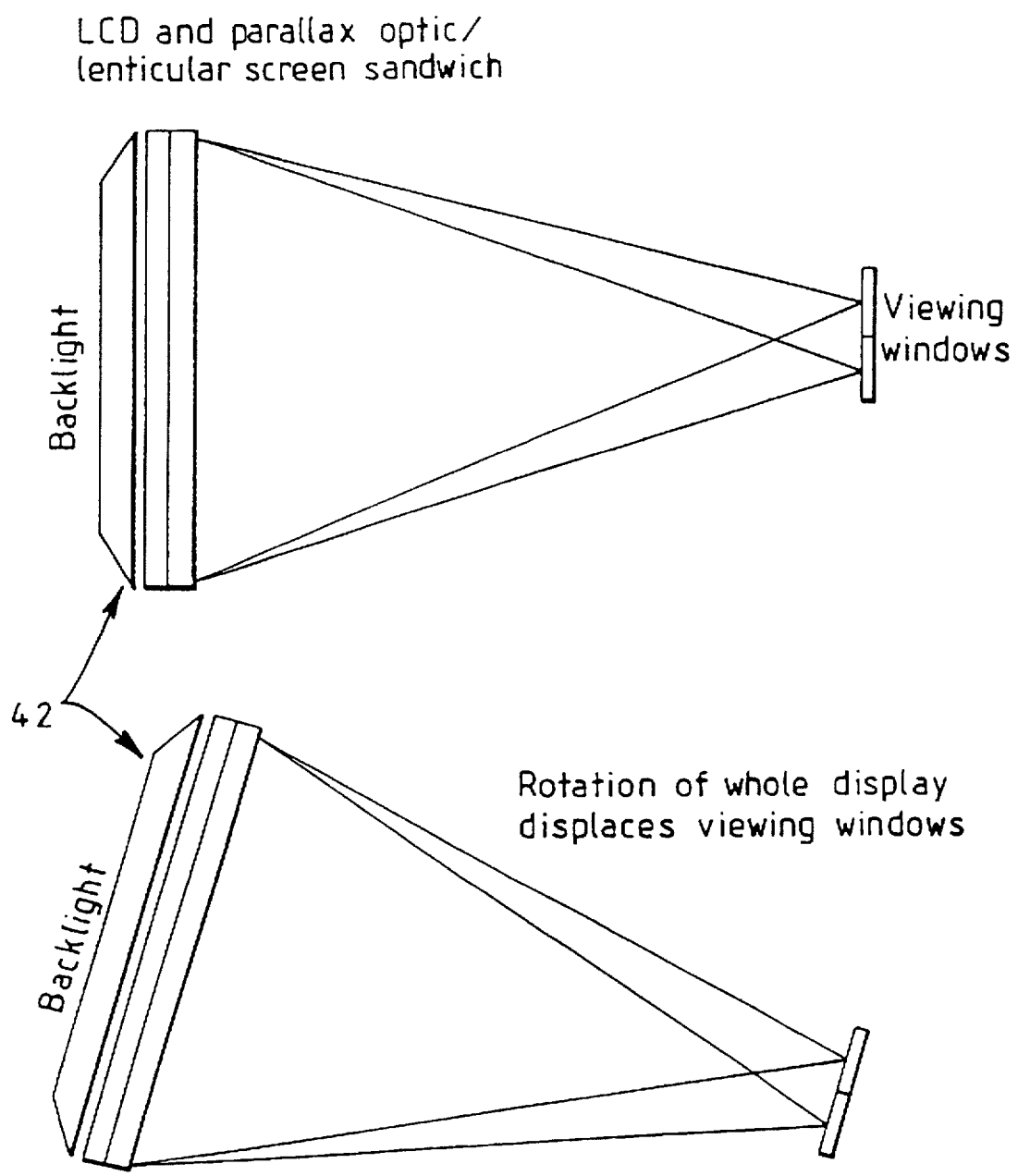

FIG. 17 illustrates a display 42 which may, for instance, be of any of the types shown in FIGS. 14 to 16 but with fixed parallax barriers or lenticular screen. Observer tracking is performed by rotating the whole display under control of a suitable tracking system.

Figure 18:
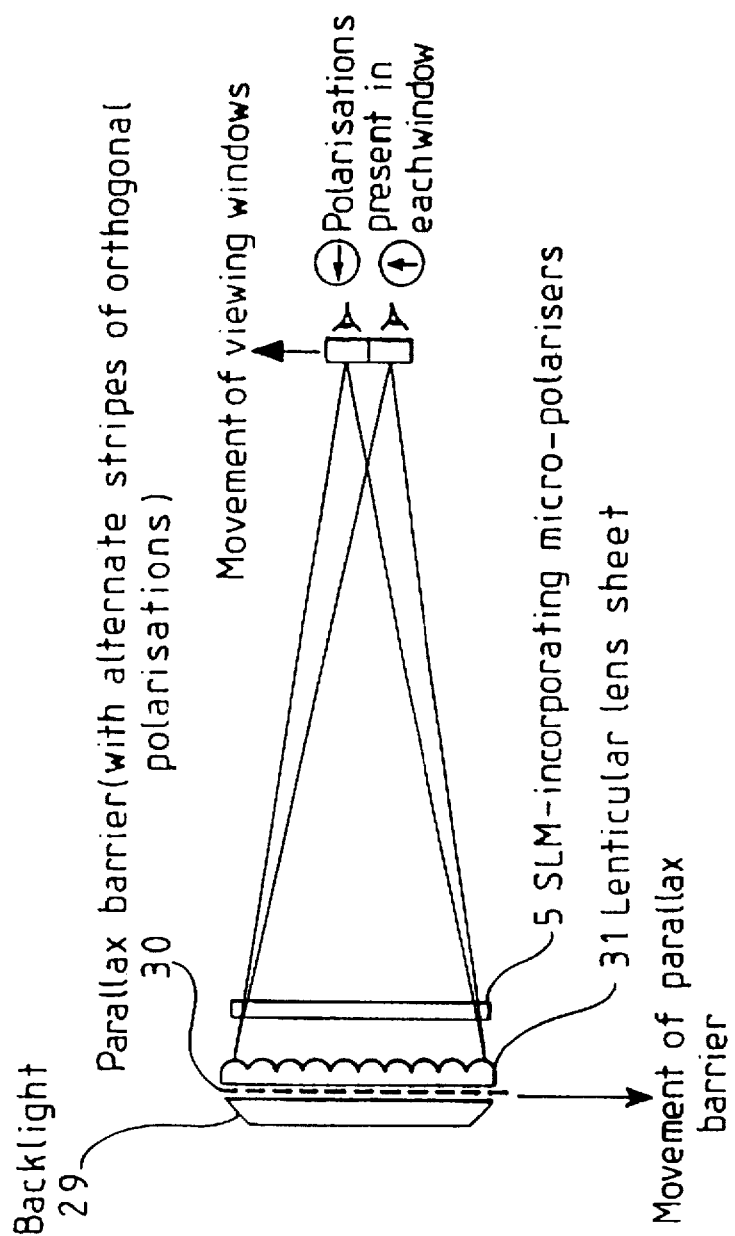

FIG. 18 shows a display of the type disclosed in EP 0 721 132. The display comprises a backlight 29 cooperating with a parallax barrier 30 which has alternate stripes of orthogonal polarisations and which is moveable with respect to a lenticular sheet 31. The SLM 5 incorporates micropolarisers having regions corresponding to pixels of the SLM with adjacent regions being of orthogonal polarisations. Movement of the barrier 30 is controlled by a suitable tracking system to track an observer.

Figure 19:
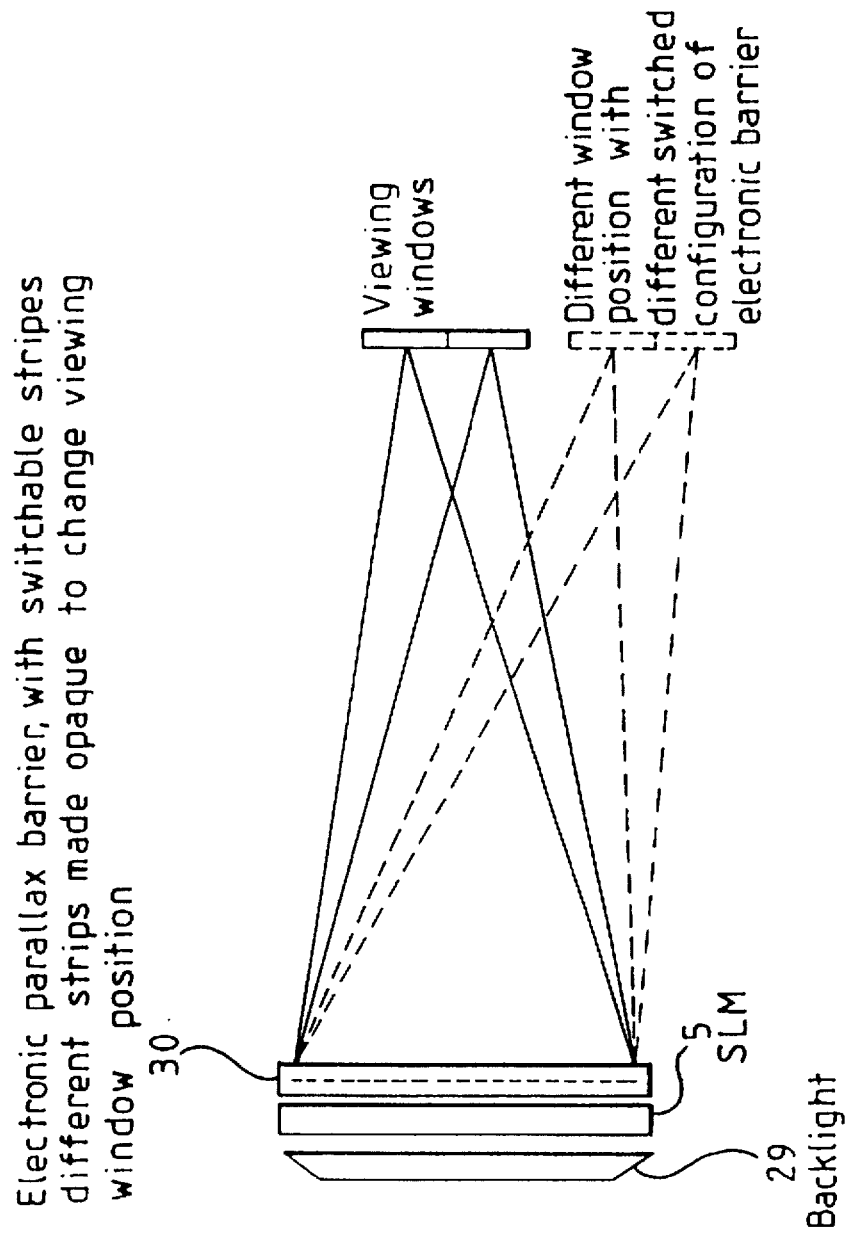

FIG. 19 shows a front parallax barrier display of the type shown in FIG. 14 but in which the parallax barrier 30 comprises an SLM, such as an LCD, controlled so as to simulate a parallax barrier by providing a plurality of substantially transparent elongate strips separated by continuous opaque regions. The transparent strips can be moved electronically in accordance with the image data supplied to the electronic parallax barrier 30 so as to simulate movement of a parallax barrier and hence provide observer tracking when controlled by a suitable tracking system.

Figure 20:
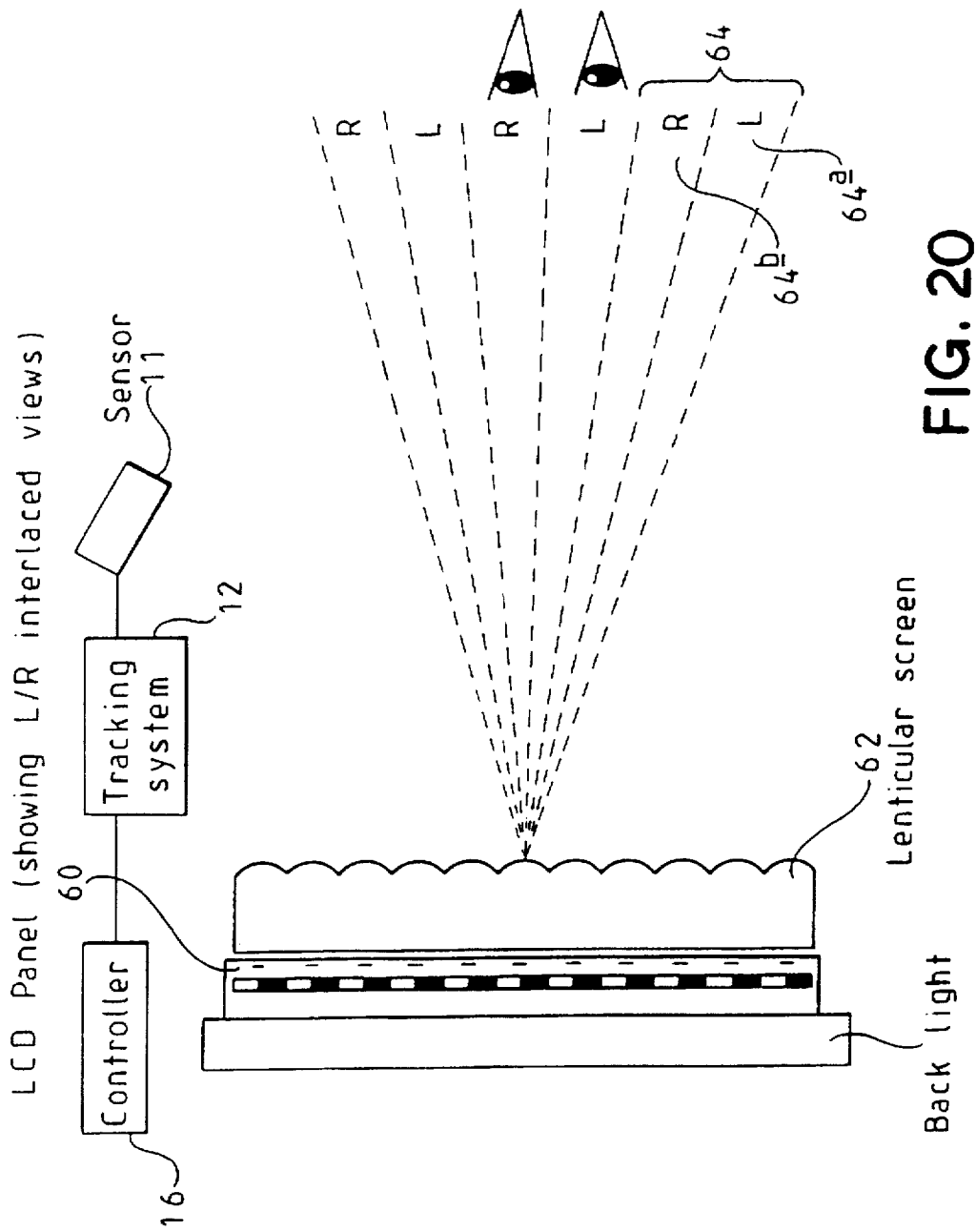
FIG. 20 is a diagrammatic view of another type of known autostereoscopic 3D display.

The display illustrated in FIG. 20 comprises a backlight liquid crystal display 60 which is positioned adjacent a lenticular screen 62. The display 60 is arranged to produce an image comprising a plurality of strips of an image intended to be viewed by the observer's left eye, and a plurality of strips of an image intended to be viewed by the observer's right eye, the two sets of strips being interlaced with one another. Each lenticule of the screen 62 is aligned with a pair of strips.

Such an arrangement is conventional, and produces a plurality of orthoscopic viewing regions such as 64, each comprising a viewing zone such as 64a in which the left image can be viewed by the observer's left eye and an adjacent viewing zone such as 64b in which the right image can be viewed by the observer's right eye. If the observer moves from such an orthoscopic viewing region to a pseudoscopic viewing region, the image displayed by the display 60 can be altered so that each part of the display 60 which was showing part of the left image now shows part of the right image, and vice versa. In order to switch the displayed image at the correct time, the position of the observer is tracked, and the tracking system requires calibration in a manner similar to that described above. An alternative method of estimating the position of the edge of the viewing zones is to measure the centres of the viewing zones as before and to take a position midway between the centres.

During calibration, the object is to locate the edge of each viewing zone rather than, say, the centre as in the previously described embodiments. Such calibration can be achieved by displaying two different images for the left and right views, the position at which the images seen by the observer's eyes switch being noted to produce a map of the observer's position and the arrangement of the images to be displayed.

A calibration technique using a calibration sheet could be used, several left and right image zones appearing on the sheet, and the positions of the boundaries between the zones being used to create a suitable map. If differently polarised light images are emitted, the sheet could be reflective to one polarisation component and absorbent to the other to produce the striped pattern for coating the edges of the viewing zones.

FIG. 20 shows only one example of a view switching display. However, other such displays may be calibrated and examples of such displays are disclosed in EP 0 726 482 and EP 0 721 131. In all such displays which are capable of observer tracking, the position of an observer is measured and is used to control the images which are visible in the viewing zones. In the case of the displays disclosed in EP 0 726 482 and EP 0 721 131, each display produces three viewing zones in several lobes. As an observer moves with respect to the display, the image data are switched so as to supply left and right views to the left and right eyes of the observer. These may be the same left and right views or may be views from a plurality of different viewpoints so as to provide a look-around facility.

While the left and right eyes of the observer are in first and second viewing zones, the image for the third viewing zone may be changed without the observer seeing this. For instance, if the observer is moving towards the next viewing zone, the image for this viewing zone may be changed when the eyes of the observer are disposed symmetrically with respect of a boundary between the first and second viewing zones.

Figure 21:
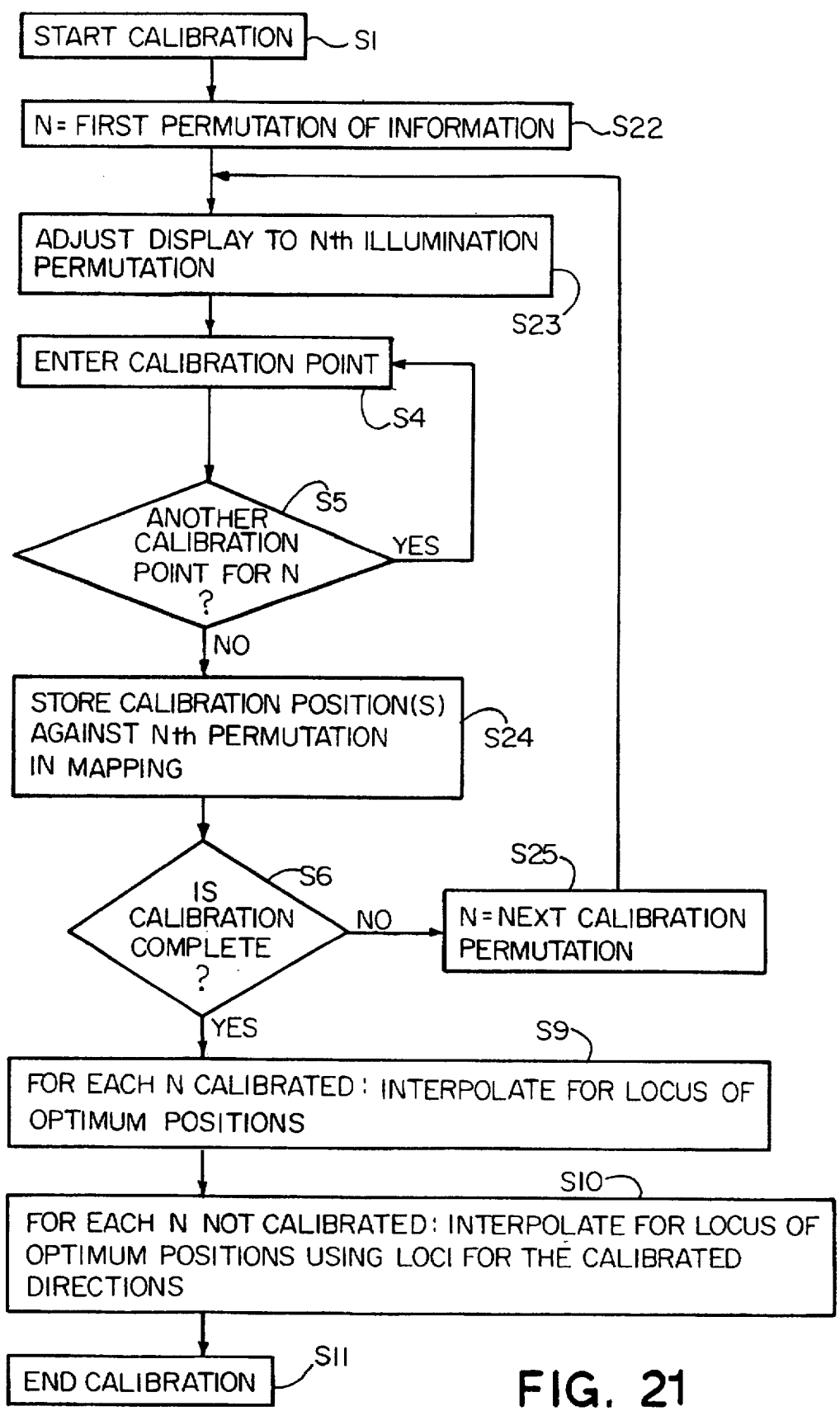
FIG. 21 is a flow diagram illustrating a calibration method for the display of FIG. 20 constituting a third embodiment of the invention.

In order to calibrate displays of the view switching type, the method illustrated in FIG. 21 may be used. This is similar to the method shown in FIG. 3.

After the start of calibration at step S1, a parameter N is set to a first permutation of information in a step S22. The display is then adjusted to the Nth permutation at step S23 and calibration points are entered in steps S4 and S5 as described hereinbefore. The calibration positions are then stored against the Nth permutation in step S24. If calibration is not complete as determined in step S6, N is set to the next calibration permutation in step S25. Once calibration is complete, interpolation steps S9 and S10 as described hereinbefore are performed.

By modifying the images displayed for each eye and appropriately tracking the observer's position, a look-around facility can be provided.

Figure 22:
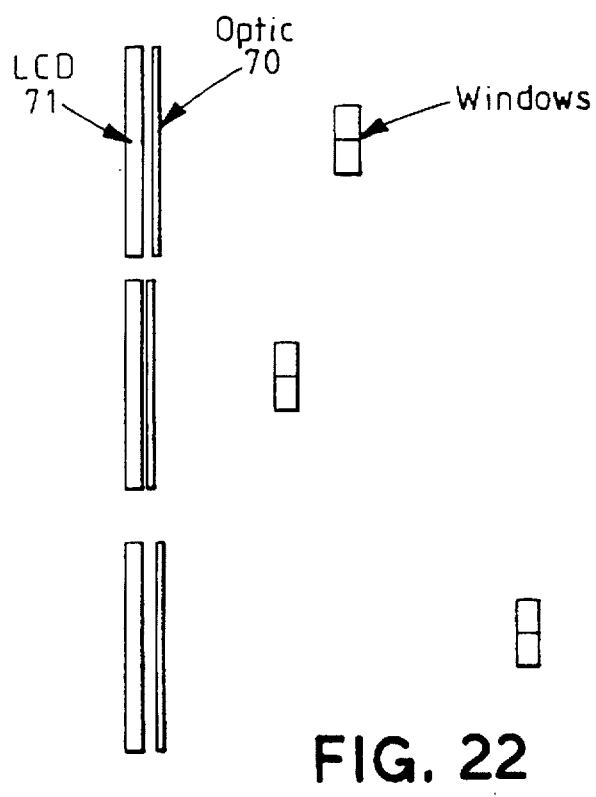
FIG. 22 illustrates the constancy of viewing window size during longitudinal tracking in flat screen autostereoscopic 3D displays.

FIG. 22 shows the effect of longitudinal translation of the parallax optic 70, such as a parallax barrier or a lenticular screen, relative to an LCD 71 in flat panel autostereoscopic 3D displays. The window distance to the display changes, but the window size remains the same. This can be used to aid the calibration of the display because, for a certain lateral observer movement, the lateral movement of the parallax optic to maintain a 3D image at the observer will be the same for all longitudinal positions of the parallax optic 70.

In particular, for displays of this type where lateral and longitudinal movement of the parallax element relative to the LCD or the like provide lateral and longitudinal movements of the windows which are effectively independent of each other, calibration can be substantially simplified.

As shown in FIG. 22, provided the optic 70 remains substantially parallel to the LCD 71 for longitudinal movement, the lateral sizes and lateral positions of the windows do not change during longitudinal tracking. Similarly, provided the separation between the optic 70 and the LCD 71 remains substantially constant during lateral relative movement, the windows move in a window plane which remains longitudinally fixed with respect to the display.

It is therefore sufficient to calibrate the display by effectively performing two one dimensional calibrations, one for lateral tracking and the other for longitudinal tracking. Because there is no interdependence between the lateral and longitudinal tracking, such simplified calibration ensure that the display is calibrated for all observer positions.

For instance, in one calibration technique for such a display, the window plane is fixed and calibration points for some or all of the possible lateral window position within that window plane are used. The lateral position of the windows is then fixed and some or all of the available longitudinal positions are calibrated. The results may be stored in two look-up tables, one for controlling lateral tracking and the other for controlling longitudinal tracking. One dimensional interpolation may be performed if necessary between the actual longitudinal calibration points and between the actual lateral calibration points. Thus, calibration is simplified and data storage requirements may be reduced. However, this technique relies on accurate alignment being maintained between the optic 70 and the LCD 71 or between equivalent components of other types of displays.

Figure 23:
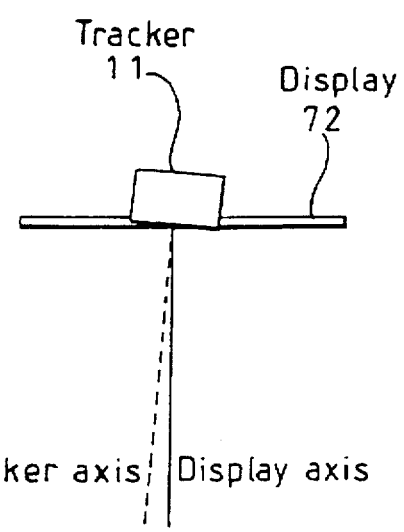
FIG. 23 illustrates tracker misalignment.

As shown in FIG. 23, misalignments between the display 72 and the observer tracker 11 will mean that the absolute measurement of lateral observer position from the tracker 11 will be different from the expected lateral observer position relative to the display at different longitudinal observer positions. This must be compensated for in the calibration system.

Figure 24:
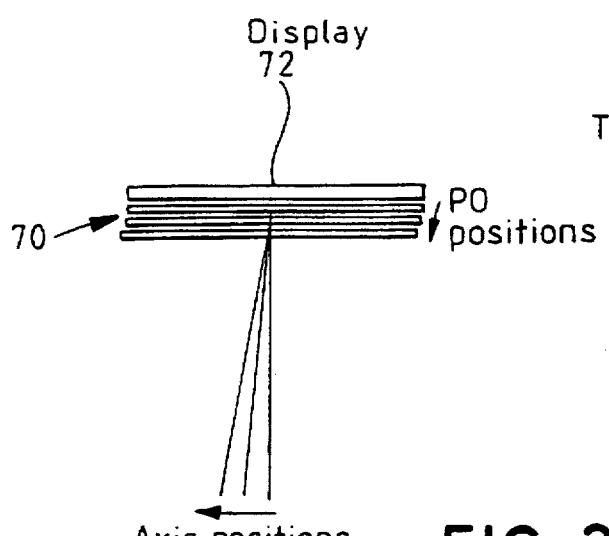
FIG. 24 illustrates misalignment which may occur during longitudinal mechanical tracking.

FIG. 24 shows that the axis of the optical system can move as the parallax optic 70 is translated longitudinally. Again, this should be compensated for in the calibration of the display.

Figure 25:
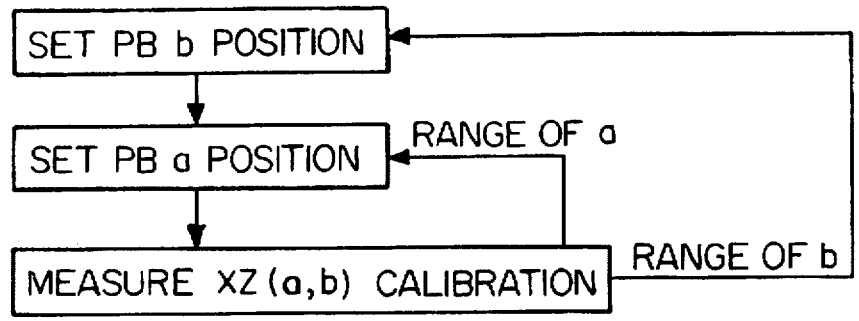
FIG. 25 is a schematic flow diagram illustrating tracking calibration.

The following notation will be used hereinafter:

$X_n$ $n^{th}$ lateral observer position measured during calibration $Z_n$ $n^{th}$ longitudinal observer position measured during calibration $X_t, Z_t$ coordinates of observer measured during tracking a lateral parallax barrier position b longitudinal parallax barrier position $a_t, b_t$ parallax barrier positions determined during tracking − Approximately equals → Maps to The calibration techniques described hereinbefore are illustrated schematically in FIG. 25. For each position (a,b) of the parallax barrier, the allowed positions of the observer $(X_n, Z_n)$ are measured. A gradient d(a,b) and intercept c)a,b) are then calculated via known methods for a "best fit" straight line:

$$Z_n \text{—} c(a,b) + d(a,b) \cdot X_n \text{ (for all n)}$$

for the measured positions $(X_n, Z_n)$ at the given (a,b) values. Once all the a and b permutations have been covered, the tables of parameters c(a,b) and d(a,b) are stored.

For each position b of the barrier, the best viewing distance $Z_{best}$ is found and the mapping from $Z_{best} \rightarrow b$ stored. This may also usefully be stored as a line with a best-fit gradient $\alpha$ and intercept $\beta$ determined by standard techniques such that:

$$b \text{—} \alpha + \beta Z$$

The parameters $\alpha$ and $\beta$ are then stored for use during tracking. The best viewing distance can generally be found by an observer positioning themselves so that the display switches quickest from one window to the nest as they move laterally. For example, if one window is a white image and the adjacent image is a black image, the optimum window distance is found when an observer sees the whole of the display switch from white to black simultaneously as they move laterally across the window boundary.

Figure 26:
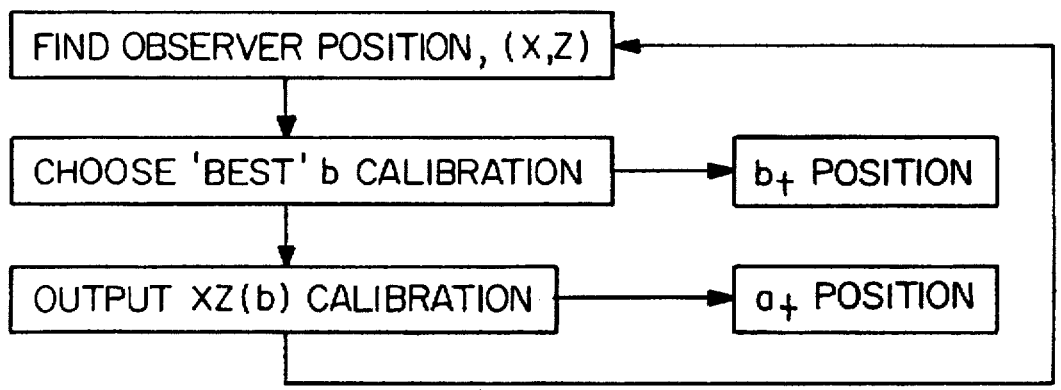
FIG. 26 is a schematic flow diagram illustrating control of tracking.

In operation as shown in FIG. 26, for an arbitrarily positioned observer $(X_t, Z_t)$, the tracking system moves the stage to the best position for the particular viewing distance $b_t$ which is given by $$b_t \text{—} \alpha + \beta Z_t$$

and then the table of fitted lines c(a,b) and d(a,b) is used to find the best lateral position of the parallax optic. This is done by deciding which fitted line the observer position is closest to and using the "a" value that the line corresponds to as the best lateral position of the parallax optic. This is essentially done by minimizing $$(c(a,b_t) + d(a,b_t)(Z_t) - X_t \qquad (i)$$

with respect to a to determine a, with b, determined as above.

This approach has a number of disadvantages. A large amount of data has to be taken from the display at the input calibration stage, giving a lengthy and expensive calibration. If there are M possible lateral positions of the optic and P possible longitudinal positions, then the number of calibration points to be taken is of the order of M×P. Also, a large amount of data has to be stored; 2M×P parameters are required. Further, processing time can be significant due to the selection of the appropriate data set and calculation of the appropriate calibration based on this. The main length of time is taken in minimising the expression (i) with respect to a. This requires many calculations to be made (often with square roots and other "slower" mathematical operations for computers to perform) in finding which of the many lines is best.

Figure 27:
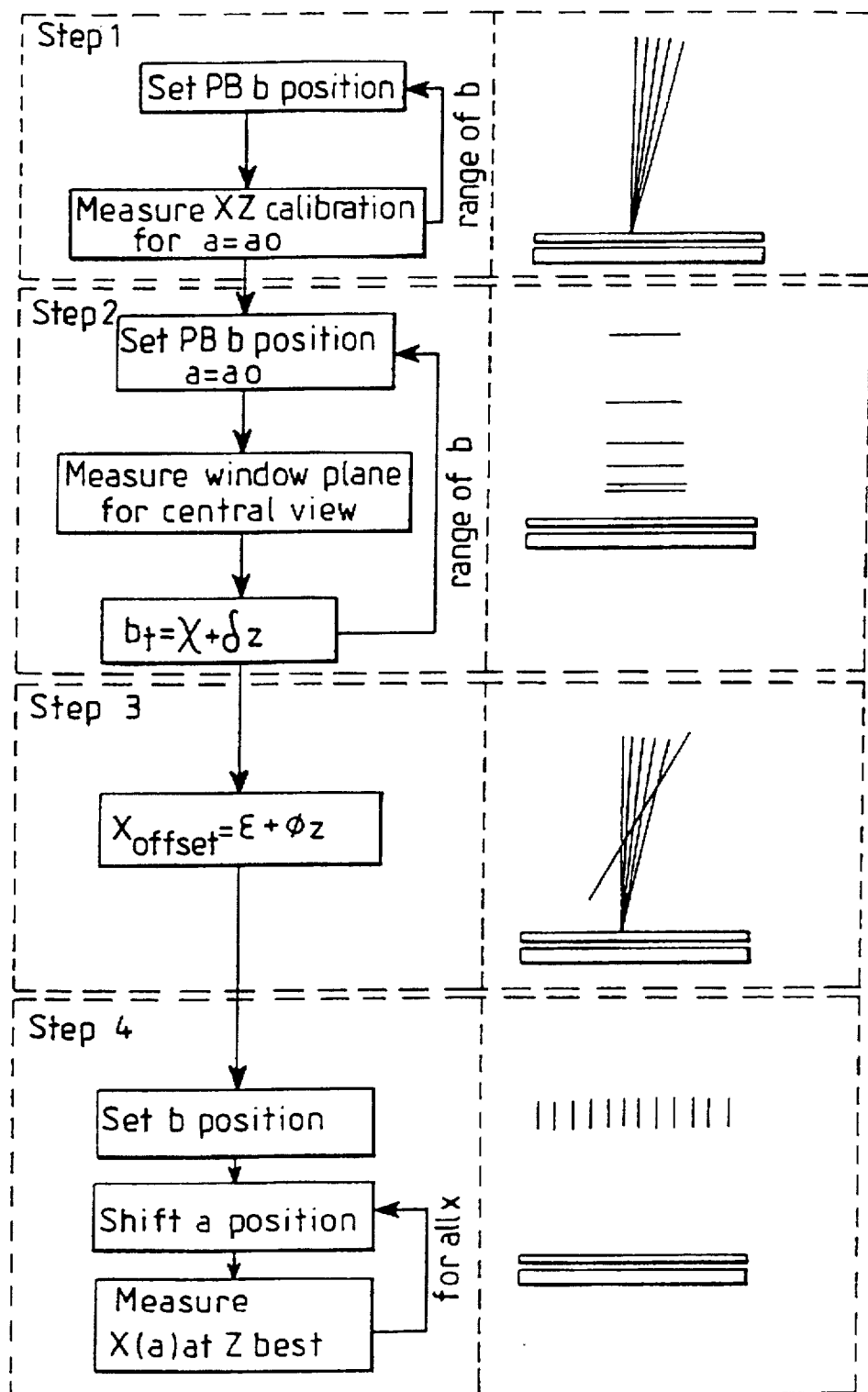
FIG. 27 illustrates the steps of another calibration technique.

A modified calibration technique illustrated in FIG. 27. In this case, more steps are followed, but over a smaller range of data.

In step 1, a single lateral parallax optic position $a_o$ is set. For a number of longitudinal positions $b_i$, the allowed position of an observer in the central lobe is measured to give a set of best-fit lines determined from the calibrated observer positions $(X_n, Z_n)$.

Next, in step 2, for the same position $a_o$, the best window plane positions are measured, as shown above to give the optimum Z position for a given $b_i$. Once again, a best-fit line is produced with gradient $\delta$ and intercept $\chi$ such that:

$$b \text{—} \chi + \delta Z$$

In step 3, the offset in the lateral calibration due to tracking sensor errors and mechanical translation errors can be found. This is done by taking each position $b_i$ in turn and finding the optimum Z location $Z_i$ from the calibration step immediately above. Then an $X_i$ position is obtained directly from the best-fit line for the given $b_i$ in the first calibration step using the $Z_i$ value. Once each b position has been cycled through, there will be a set of points $(X_i, Z_i)$ which are then used to fit a straight line in the usual manner. The intercept and gradient of this line are denoted by $\epsilon$ and $\phi$, respectively. This straight line gives the offset in X position of the observer generated as the observer moves in the Z direction and the barrier is moved correspondingly. It is the error in the alignment of the tracking system with the display and the longitudinal movement actuator of the parallax optic with the display.

Finally in step 4, for a known arbitrary longitudinal optic position b and an observer positioned at the window plane $Z_{best}$, the mapping between each lateral optic position $a_j$ and the corresponding optimum lateral observer position $X_I$ is determined. A third straight line may be fitted through the data so that $$a = \gamma + \eta(X - (\epsilon + \phi Z_{best}))$$

where $\gamma$ and $\eta$ are the best-fit intercept and gradient of this line. The $(\epsilon + \phi Z_{best})$ term appears so that the X positions are corrected for the offset determined in step 3 and consistency when this is included during tracking.

Figure 28:
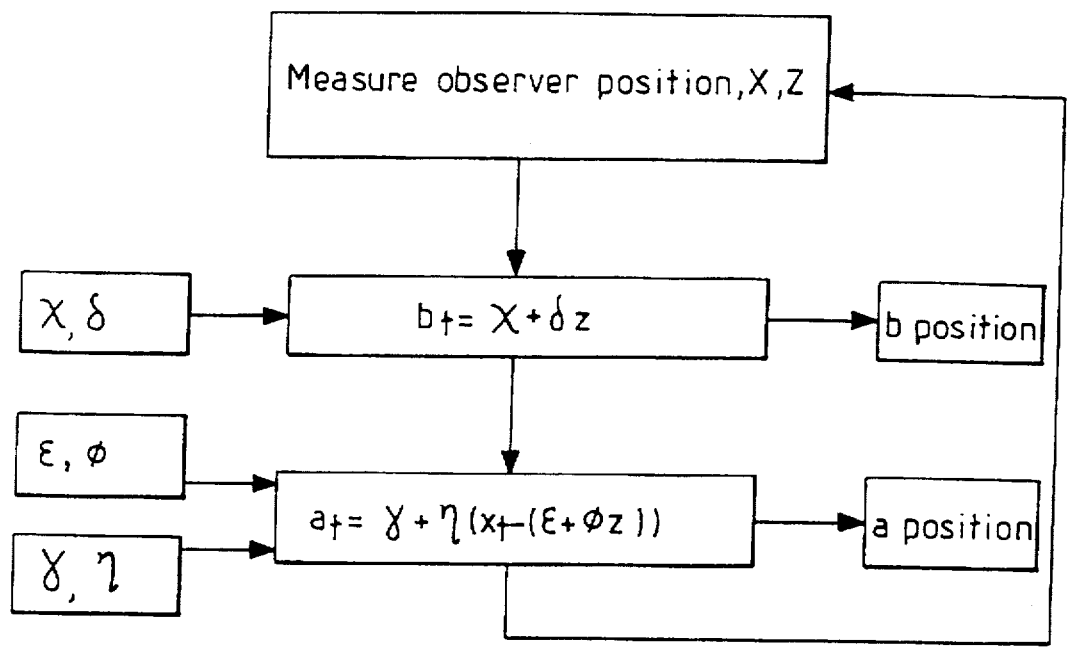
FIG. 28 is a schematic flow diagram illustrating control of tracking based on the technique of FIG. 27.

In the output calibration system or during tracking as shown in FIG. 28, a reading of observer position is found $(X_t, Z_t)$. This is used to find the best longitudinal position $b_t$ of the barrier from:

$$b_t = (\chi + \delta Z)$$

The X position is then adjusted to take into account the offsets from possible misalignment by adjusting $X_t$ to $X_{adj}$ by:

$$X_{adj} = X_t - (\epsilon + \Phi Z)$$

The lateral position of the parallax optic is then determined by:

$$a_t = \gamma + \eta x_{ajt}$$

This technique has several advantages:

data are stored in only three lines with parameters $\chi$, $\delta$, $\epsilon$, $\phi$, $\gamma$, $\eta$;

calibration time is reduced. If there are M possible lateral positions of the optic and P possible longitudinal positions, then the number of calibration points to be taken is of the order of M+2P;

storage requirement is reduced. Instead of 2M×P parameters to be stored, there are now six;

processing time is greatly reduced as the calibration now only requires three straightforward arithmetic calculations and no lengthy minimisation routine.

While the above description has referred to straight lines being used to fit the data points to, an improved method may use smooth curves, such as parabolas, to fit the lines to. However, this would require more parameters to be stored and more processing time for the calculations during tracking.

The description hereinbefore of determining the position of an observer has been in terms of Cartersian coordinates. Some observer tracking sensors, such as the Dynasight (trade mark), provide outputs which indicate the observer position in terms of such Cartesian coordinates. For displays of the type particularly described hereinbefore, two such coordinates which give the lateral (X) and longitudinal (Y) position of the observer with respect to the display are required, although vertical (Y) measurements may also be made for vertical tracking and/or for look-around facilities.

Other types of sensors provide outputs indicating the position of the observer in terms of polar coordinates and, in particular, in terms of the angles of a vector from the sensor to the observer relative to two reference planes.

Figure 29:
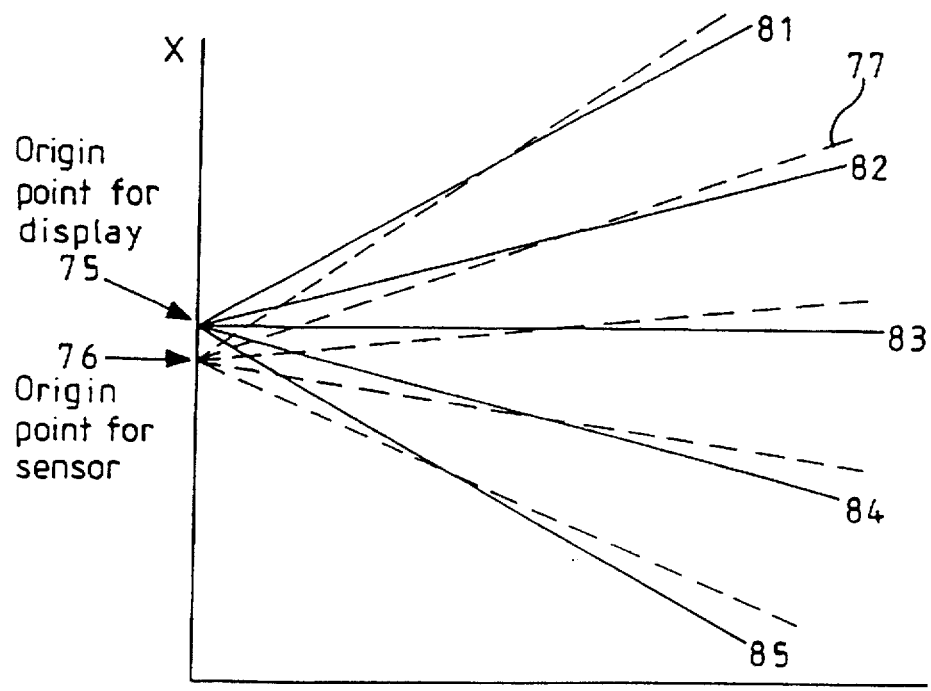
FIG. 29 is a diagram illustrating the use of a polar coordinate tracking system.

Many directional displays provide viewing zones in the shape of cones or wedges which emanate from a common origin point. This is illustrated in FIG. 29 where the origin point is at 75 and the display provides viewing zones in directions indicated by unbroken lines 81 to 85. In this case, the viewing zones are substantially equi-angularly spaced in the horizontal XZ plane. By providing a tracking sensor of the type which determines the angle in the horizontal plane from the display to the observer, a single angular parameter can be used to control observer tracking since no vertical tracking is provided and the distance to the observer is irrelevant provided the display directs the viewing zone or zones at the correct angle for the observer. Tracking sensors in the form of charge coupled device camera systems and position sensitive detectors with lenses provide suitable angular measurements and, provided the origin point for the sensor coincides with the origin point 75 for the display, no further measurement of observer position is necessary. This avoids the need for measurement or calculation of the longitudinal or Z position of the observer and so simplifies calibration and operation of an observer tracking display using an angular sensor of this type. Any of the calibration processes described hereinbefore may be used to calibrate a display using an angular sensor.

FIG. 29 also illustrates the effect of a displacement between the origin point 76 of the angular sensor and the origin point 75 of the display. The broken lines such as 77 indicate some of the directions from the origin point 76 of the sensor and, in particular, those closest to the directions 81 to 85 of the viewing zones of the display. Any displacement between the origin points 75 and 76 should be minimised, for instance during manufacture, to ensure correct tracking, although small displacements may be tolerated.

Although only described with reference to 3D applications, the calibration method is also applicable to 2D displays in which the observer is tracked, such tracking being used to adjust the displayed image in some way.

What is claimed is:

1. A method of calibrating an observer tracking display of the type forming a steerable viewing zone and comprising a tracking system for tracking the position of an observer and a controller for controlling the direction of the viewing zone in response to the tracking system, the method comprising the steps of:

steering the viewing zone in a plurality of directions in turn;

establishing an optimum viewing position for each of the directions;

determining each of the optimum positions by means of the tracking system; and associating in the controller each of the determined optimum positions with the corresponding direction.

2. A method as claimed in claim 1, wherein the establishing step comprises establishing each of the optimum viewing positions at a position of greatest light intensity.

3. A method as claimed in claim 1, wherein the establishing step comprises establishing each of the optimum viewing positions at the center of the viewing zone.

4. A method as claimed in claim 1, wherein the display is an autostereoscopic 3D display forming first and second viewing zones.

5. A method as claimed in claim 4, wherein the establishing step comprises establishing each of the optimum viewing positions at a position substantially equidistant from the centers of the first and second viewing zones.

6. A method as claimed in claim 4, wherein the establishing step establishes each of the optimum positions at a position of minimum crosstalk between the first and second viewing zones.

7. A method as claimed in claim 1, wherein the establishing step comprises moving a light sensor until each of the optimum viewing positions is established.

8. A method as claimed in claim 7, wherein the sensor is the observer.

9. A method as claimed in claim 1, wherein the associating step comprises forming a mapping from the determined optimum positions to a steering control parameter of the viewing zone.

10. A method as claimed in claim 9, wherein the map forming step further comprises interpolating between the determined optimum positions.

11. A method as claimed in claim 10, wherein the interpolation is a linear interpolation.

12. A method of calibrating an observer tracking display of the type forming a steerable viewing zone and comprising a tracking system for tracking a position of an observer and a controller for controlling directions of the viewing zone in response to the tracking system, the method comprising the steps of:

locating a sensor for determining optimum illumination at a plurality of positions in turn;

positioning the viewing zone in an optimum direction at which the sensor is optimally illuminated;

determining the position of the sensor by means of the tracking system; and associating in the controller each of the optimum directions with the corresponding determined position.

13. A method as claimed in claim 12, wherein the positioning step comprises positioning the viewing zone so that the sensor determines the greatest light intensity.

14. A method as claimed in claim 12, wherein the positioning step comprises positioning the viewing zone so that the sensor is nearest the center of the viewing zone.

15. A method as claimed in claim 12, wherein the display is an autosteroscopic 3D display forming first and second viewing zones.

16. A method as claimed in claim 15, wherein the sensor comprises first and second sensing regions and the positioning step comprises positioning the viewing zones for optimum illumination of the first and second sensing regions by the first and second viewing zones, respectively.

17. A method as claimed in claim 12, wherein the sensor is a reflector.

18. A method as claimed in claim 17, wherein an imaging device monitors the reflector for detecting optimal illumination.

19. A method as claimed in claim 12, wherein the associating step comprises forming a mapping from the determined positions to a steering parameter of the viewing zone or zones.

20. A method as claimed in claim 19, wherein the map forming step further comprises interpolating between the determined positions.

21. A method as claimed in claim 20, wherein the interpolation is a linear interpolation.

22. An observer tracking autostereoscopic 3D display comprising:

means for forming steerable first and second viewing zones;

a vision system and a controller for the vision system being arranged to determine the position of eyes of an observer and to determine the positions of the first and second viewing zones with respect to the eyes, the controller being arranged to control the forming means so as to position the first and second viewing zones optimally with respect to the eyes.

23. A display as claimed in claim 22, wherein the forming means is controllable so as to match the horizontal spacing of the first and second viewing zones to the interocular distance of the observer.

24. A display as claimed in claim 22, wherein the forming means is controllable so as to match the height of the first and second viewing zones to the height of the eyes.

25. A display as claimed in claim 22, wherein the controller is arranged to perform a calibration by forming a mapping from observer positions to a control parameter of the forming means.

26. A display as claimed in claim 25, wherein the controller is arranged to update the mapping periodically.

27. A display as claimed in claim 25, wherein the controller is arranged to store a plurality of viewing zone parameters corresponding to a plurality of observers and to use one of or each corresponding parameter wherein the vision system recognizes any of the plurality of observers.

28. A method of calibrating an observer tracking display of the type which forms a plurality of fixed viewing zones and which comprises a tracking system for tracking the position of an observer and a controller for controlling images supplied to the viewing zones in response to the tracking system, the method comprising the steps of:

displaying different images in at least two of the viewing zones;

establishing at least one viewing position for the at least two viewing zones;

determining the or each viewing position by means of the tracking system; and deriving from the or each determined position an image changing point for the controller.

29. A method as claimed in claim 28, wherein the displaying step comprises displaying the different images in the viewing zones of a plurality of pairs of viewing zones in turn.

30. A method as claimed in claim 28, wherein the or each established viewing position comprises an optimum viewing position for the at least two viewing zones.

31. A method as claimed in claim 30, wherein the or each optimum viewing position comprises a position substantially equidistant from and symmetrical with respect to the centers of two of the viewing zones.

32. A method as claimed in claim 30, wherein the or each optimum viewing position comprises a position of minimum crosstalk between two of the viewing zones.

33. A method as claimed in claim 28, wherein each established viewing position comprises an edge of one of the viewing zones.

34. A method as claimed in claim 28, wherein the establishing step comprises moving a light sensor until the or each viewing position is established.

35. A method as claimed in claim 34, wherein the light sensor is the observer.

36. A method as claimed in claim 28, wherein the deriving stop comprises forming a mapping from the or each determined viewing position to the or each image changing point.

37. A method as claimed in claim 36, wherein there is a plurality of determined viewing positions, and the map forming step comprises interpolating between the determined positions.

* * * * *